Figure 1:
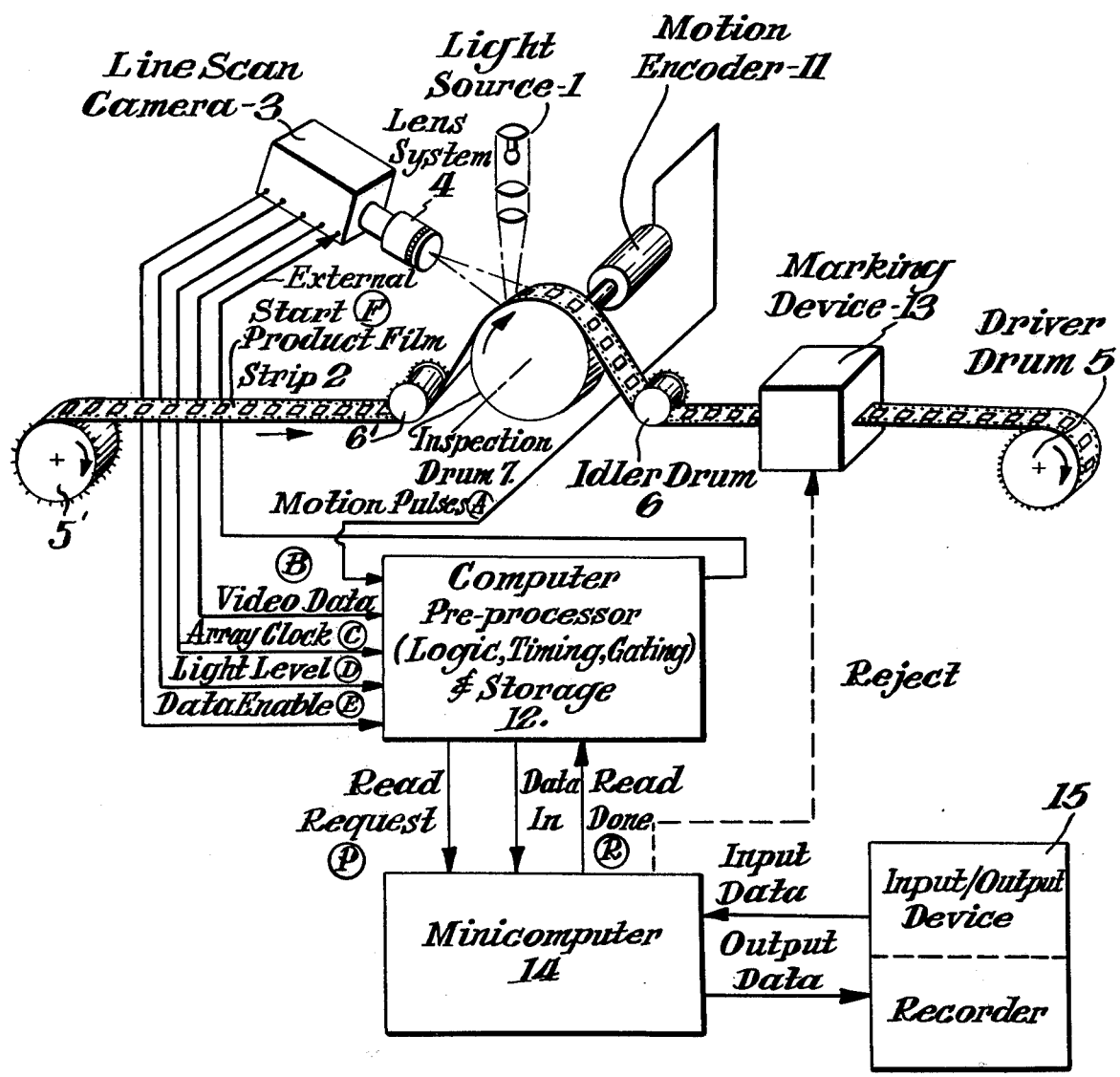

United States Patent [19] [11] 4,166,541
Smith, Jr. [45] Sep. 4, 1979

[54] BINARY PATTERNED WEB INSPECTION

[75] Inventor: Edmund H. Smith, Jr., Wilmington, Del.

[73] Assignee: E. I. Du Pont de Nemours and Company, Wilmington, Del.

[21] Appl. No.: 829,248

[22] Filed: Aug. 30, 1977

[51] Int. Cl.² .............................................. B07C 5/00
[52] U.S. Cl. .................................... 209/587; 209/598; 250/563; 356/398; 356/431
[58] Field of Search ................... 209/73, 74 R, 74 M, 209/111.5, 111.7 R, 111.7 T, 552, 576, 577, 587, 598; 250/559, 562, 563, 571, 572; 356/156, 167, 199, 200

[56] References Cited

U.S. PATENT DOCUMENTS

| | | | |
|---|---|---|---|
| 3,835,332 | 9/1974 | Bridges | 356/200 X |
| 3,944,369 | 3/1976 | Cuthbert et al. | 356/167 |
| 4,040,745 | 8/1977 | Belleson et al. | 356/167 |

Primary Examiner—Joseph J. Rolla

[57] ABSTRACT

An electro-optical inspection system for a binary patterned web which automatically determines registration and the quality of subjects of inspection by comparison with a master pattern stored in the memory of a computer and then passes or rejects individual subjects of inspection depending on the outcome of the comparison effected.

5 Claims, 28 Drawing Figures

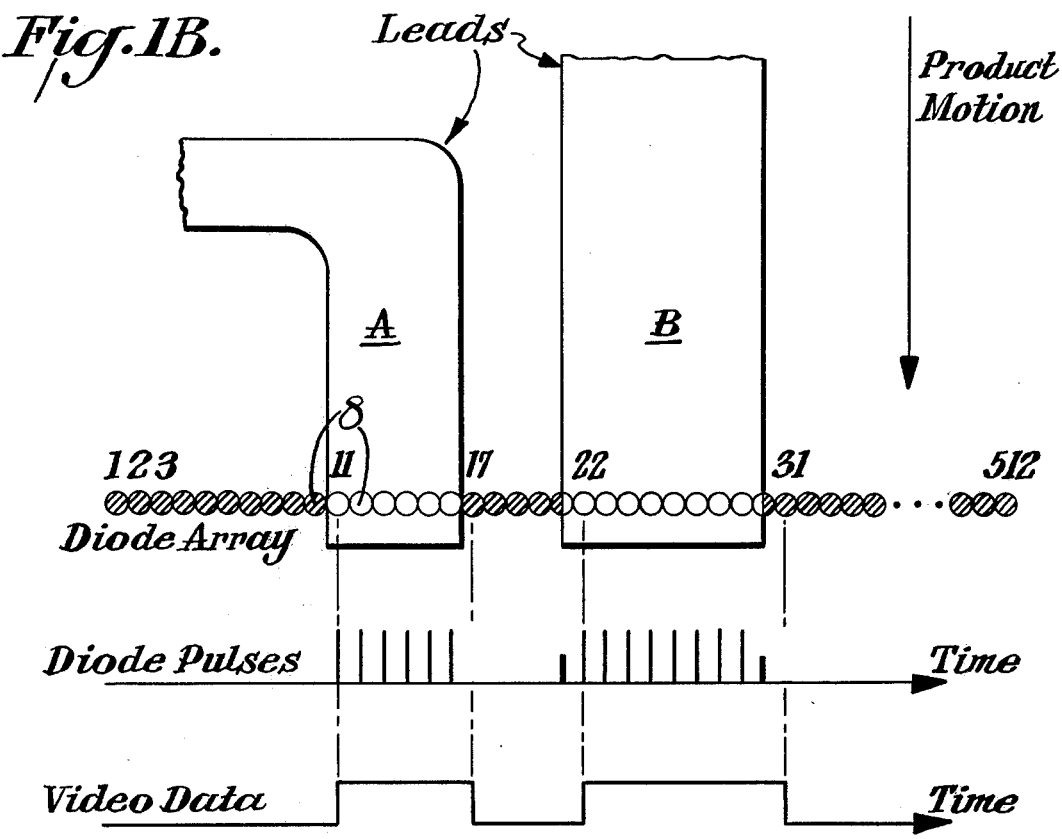
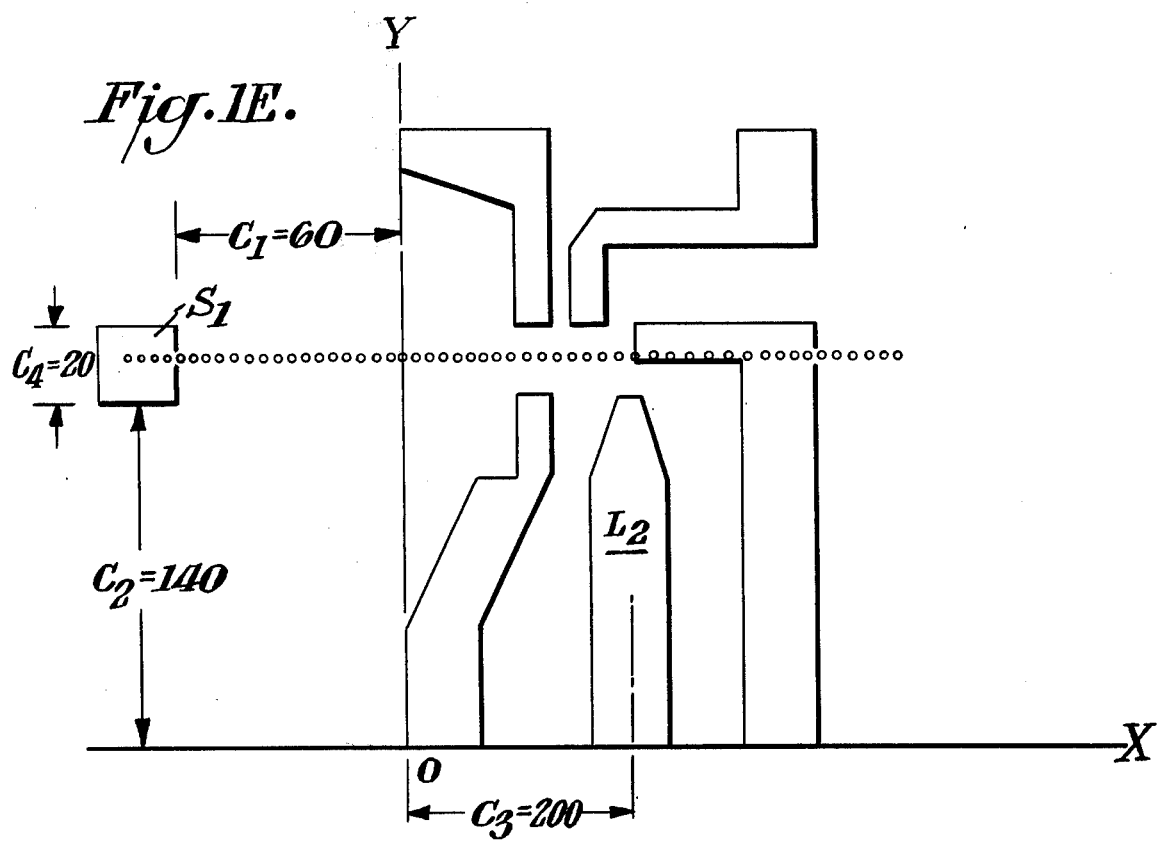

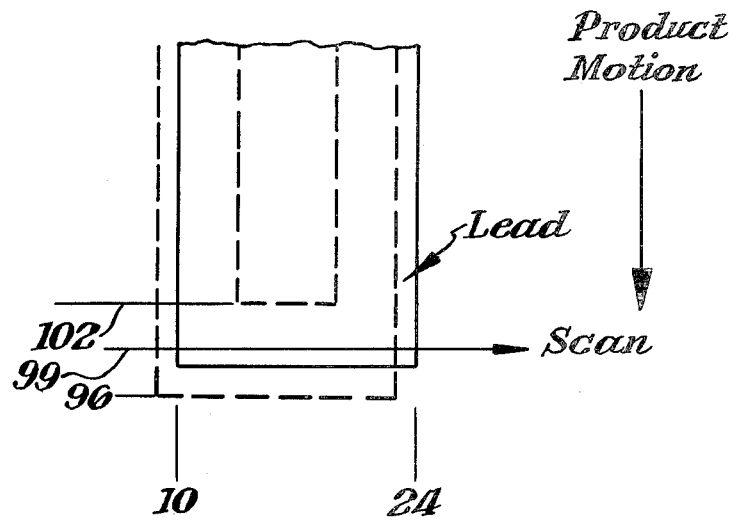

Scan Transition Points

| TD Video Data | TD Reference | TD Tolerance | MD Video Data | MD Reference | MD Tolerance |
|---|---|---|---|---|---|
| . | . | ±2 | . | . | ±3 |
| . | . | ±2 | . | . | ±3 |
| . | . | ±2 | . | . | ±3 |
| 10 | 11 | ±2 | 99 | 99 | ±3 |
| 24 | 21 | ±2 | . | . | ±3 |
| . | . | ±2 | . | . | ±3 |

Do Transitions Occur Within Transverse Direction "Don't Care" Zones?

Since $9 \leq 10 \leq 13 \Rightarrow$ Yes

Since $19 \leq 24 \not\leq 23 \Rightarrow$ No $\Rightarrow$ Product Reject

Do Transitions Occur Within Machine Direction "Don't Care" Zones?

Since $96 \leq 99 \leq 102 \Rightarrow$ Yes

*Fig. 1C.*

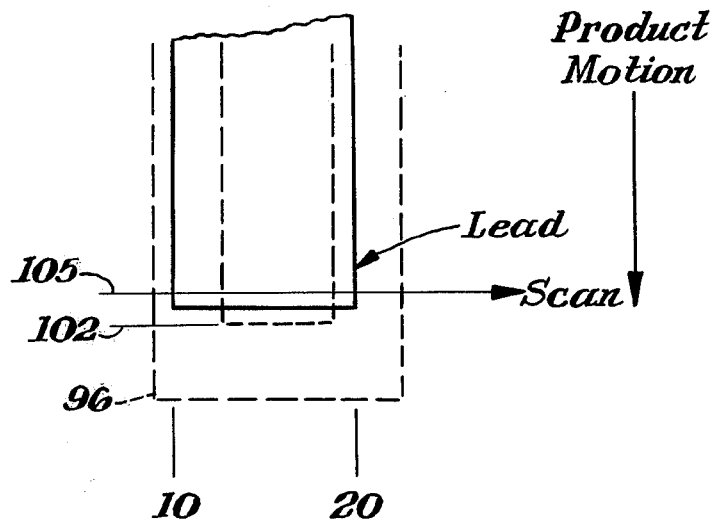

Scan Transition Points

| TD Video Data | TD Reference | TD Tolerance | MD Video Data | MD Reference | MD Tolerance |
|---|---|---|---|---|---|
| . | . | ±2 | . | . | ±3 |
| . | . | ±2 | . | . | ±3 |
| . | . | ±2 | . | . | ±3 |
| 10 | 11 | ±2 | 105 | 99 | ±3 |
| 20 | 21 | ±2 | . | . | ±3 |
| . | . | ±2 | . | . | ±3 |

Do Transitions Occur Within Transverse Direction "Don't Care" Zones?

Since $9 \leq 10 \leq 13 \Rightarrow$ Yes

Since $19 \leq 20 \leq 23 \Rightarrow$ Yes

Do Transitions Occur Within Machine Direction "Don't Care" Zones?

Since $96 \leq 105 \neq 102 \Rightarrow$ No $\Rightarrow$ Product Reject

Fig. 1D.

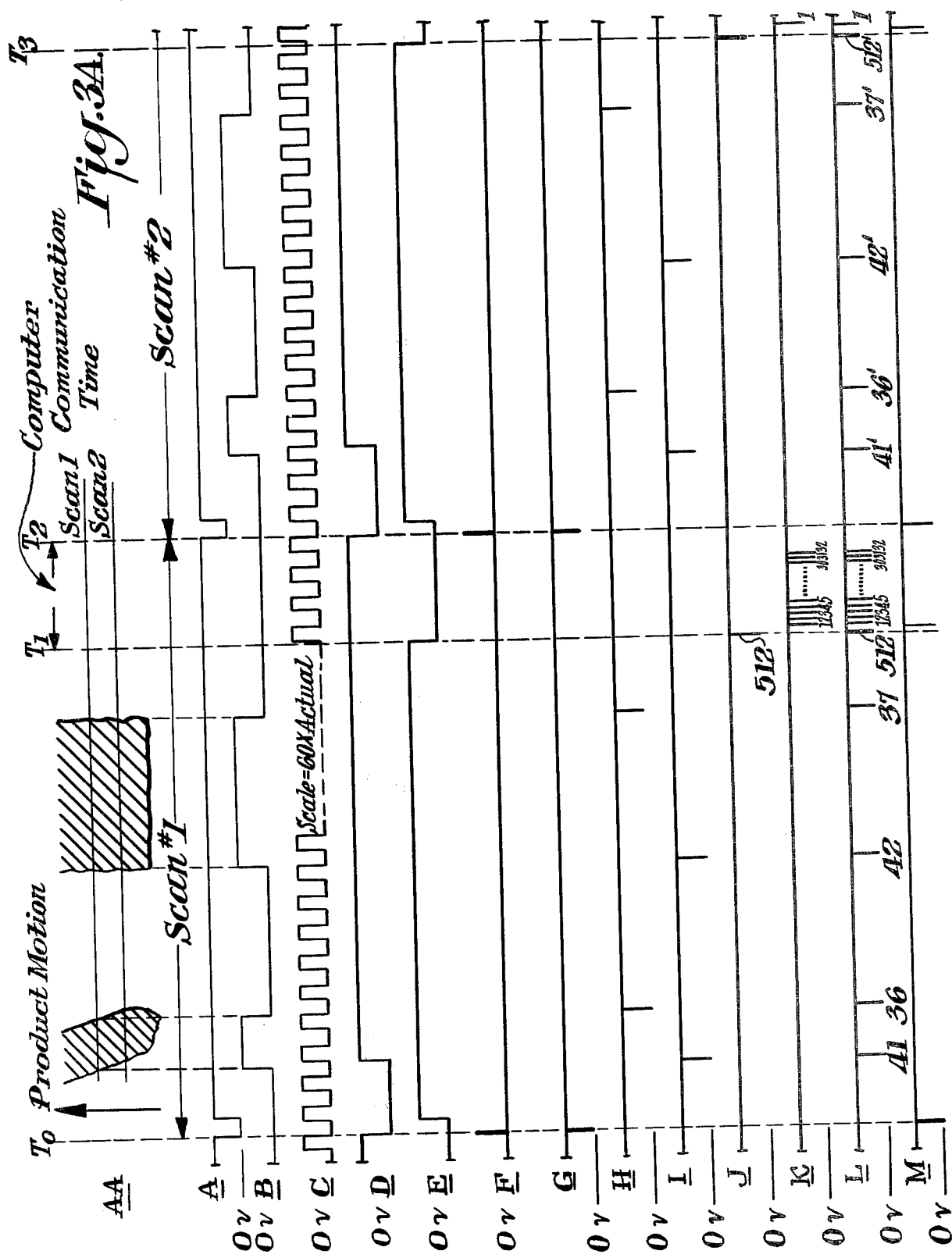

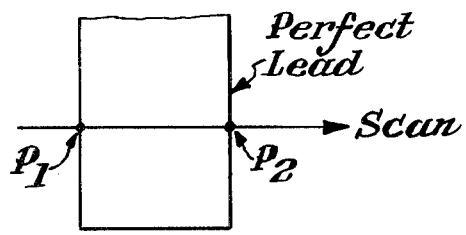
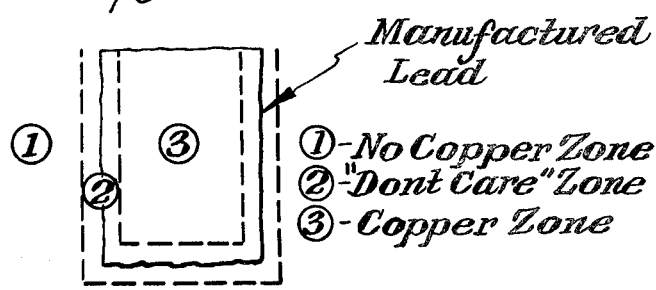
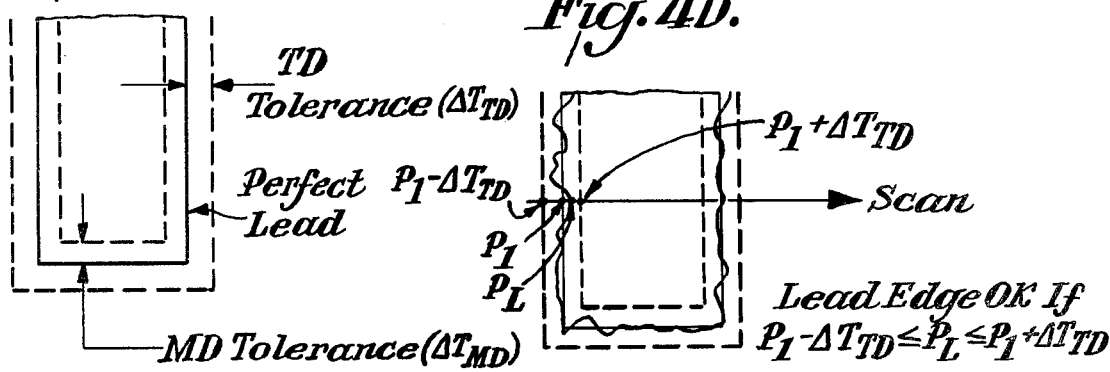
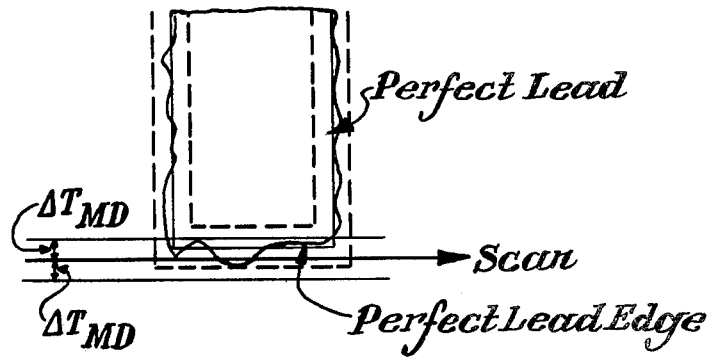

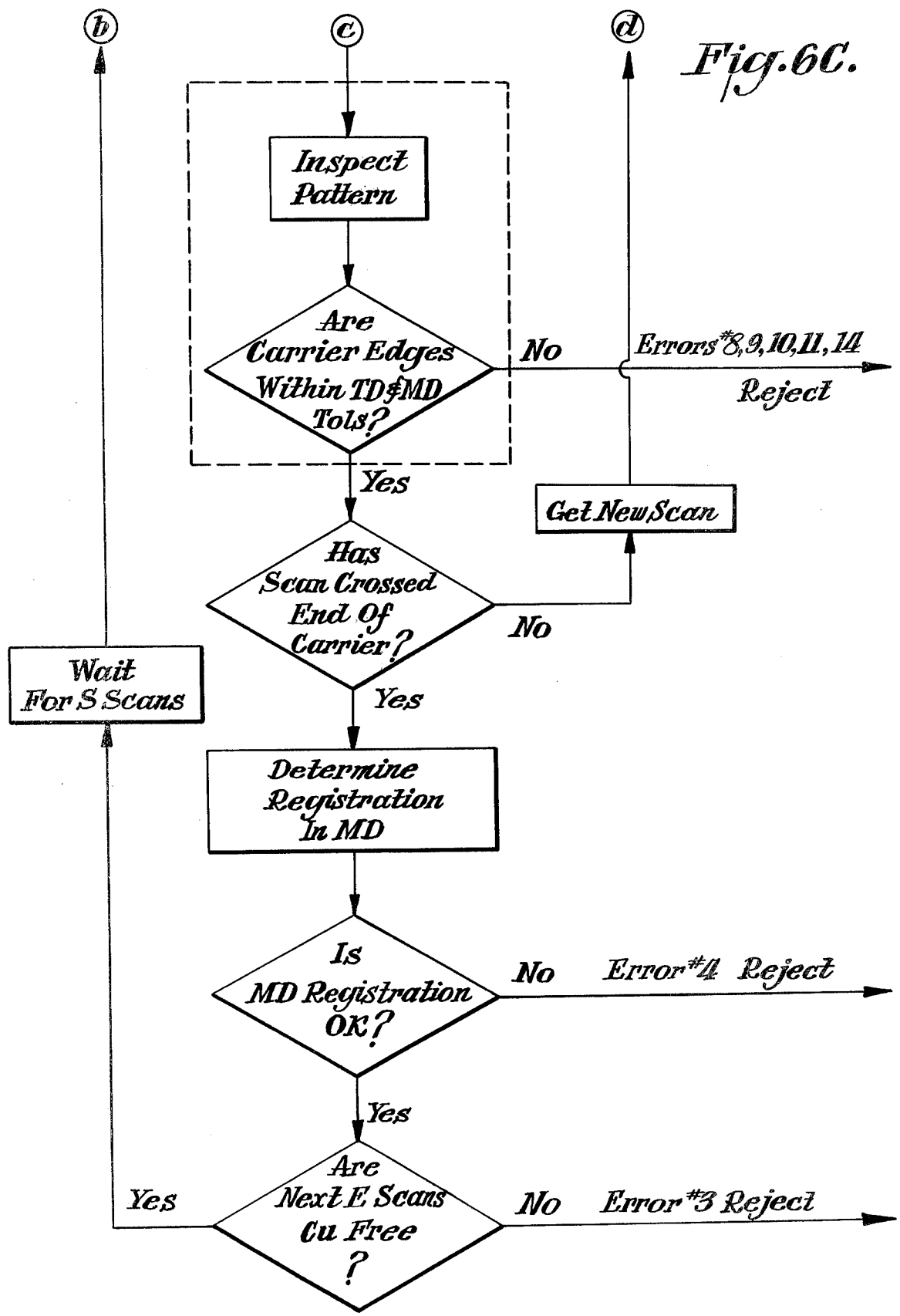

BINARY PATTERNED WEB INSPECTION

BRIEF SUMMARY OF THE INVENTION

Generally, this invention relates to an automatic electro-optical scanning inspection system for detecting and locating a variety of defect conditions in a binary patterned web in which the pattern consists of an array of optically perceptible intricately designed planar surfaces which are characterized by binary signals representative of individual preselected features thereof, and comprising: a radiation source for illuminating each subject of inspection; electro-optical means scanning said subject of inspection, detecting modulated radiation from the subject of inspection, and means generating, as data output, logic pulse signals responsive to the transitions between the presence and absence of individual features in each scan of the web; a computer pre-processor receiving the data output and composing a set of binary words incorporating the results of the electro-optical scanning together with the transverse direction location address of each said feature transition encountered; means delivering said set of binary words to a computer, said computer assigning machine direction scan location data bits to each said set of delivered binary words for identifying said set of delivered binary words with its machine direction location, comparing said identified binary word sets with their counterparts stored in computer memory defining the locations of said preselected features in an acceptable product derived from a master locational pattern, inclusive of preselected tolerance limits in both machine and transverse directions; and means responsive to the computer passing or rejecting the subjects of inspection.

THE PROBLEM

As a typical example, in the manufacture of film chip carriers (FCC) for microelectronic circuitry, no commercially available systems are known that can automatically inspect the intricate patterns of the affixed film chip carrier leads for defects at speeds exceeding one carrier/sec in order to distinguish such defects as missing or oversized leads, or leads which are bent or out of registration.

Current film chip carrier visual inspection techniques are slow and painstaking, and are not entirely objective when grading the product. An automatic inspection system is essential for consistent detection and location of pattern irregularities in order to obtain high acceptable product yields.

Furthermore, existing holographic or optical mask matching techniques have a number of shortcomings. Among these are: (1) insufficient signal-to-noise ratios to permit detection of very small dimensional irregularities, (2) quantitative measures of goodness of fit are either impossible to achieve or lack accuracy, (3) measurement accuracy is dependent upon the precision of physical positioning of either the word piece or the master in order to obtain registration, or (4) inability to classify defects according to type.

THE SOLUTION

To overcome these shortcomings, Applicant has found that requisite inspection precision can be obtained using a computer-controlled inspection system which includes: a wide spectral band width source of illumination, an image sensor (e.g., a line scan camera) to detect the light modulated by the product, a motion encoder to provide synchronizing pulses for relating each scan to an increment of product movement in the machine direction, a computer pre-processor to convert the scan signals to digital form and which can then be used to record and store the scan line or transverse locations of the carrier lead edge transition signals, a minicomputer (1) to effect registration of the scanned work piece with the coordinates of a master pattern stored in its core memory, (2) to compare the scanned pattern with the stored "blurred" master, i.e., the single line master lead pattern together with the allowable tolerance enlargements thereof, (3) to provide a record of the existence, type and location of the defective portions of the carrier lead, and (4) to effect product rejection action as regards scans not meeting the predetermined tolerances. Lastly a marking device, actuated by computer signal, is used to identify or destroy those chips not passing inspection.

The widths of the "don't care" (i.e., it is immaterial whether the item inspected contains or lacks the ingredient inspected for) tolerance zones corresponding to product specification tolerances about the film chip carrier lead pattern edges are pre-programmed into the computer in such a way that they are easily changed when specifications require and provide assurance that each carrier lead, no matter what its relative position within the pattern, will have its own tolerance band.

DRAWINGS

Figure 1A:
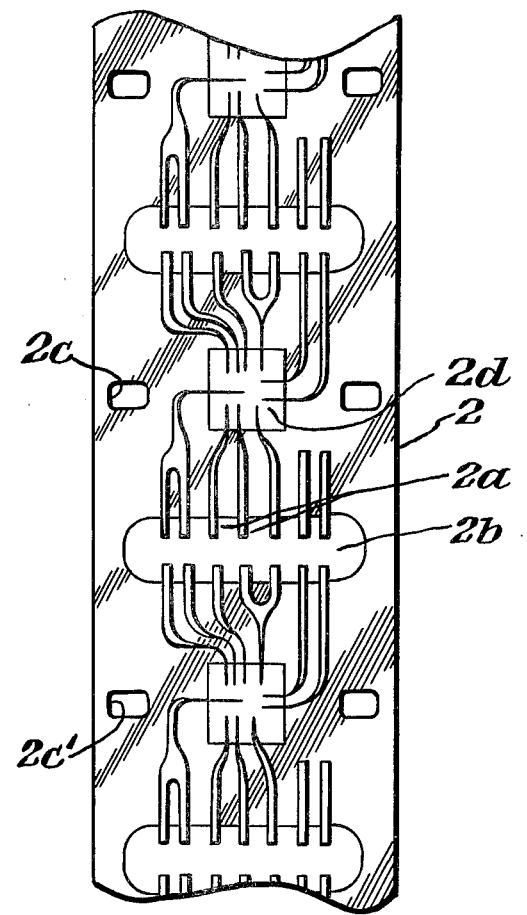
Figure 2A:
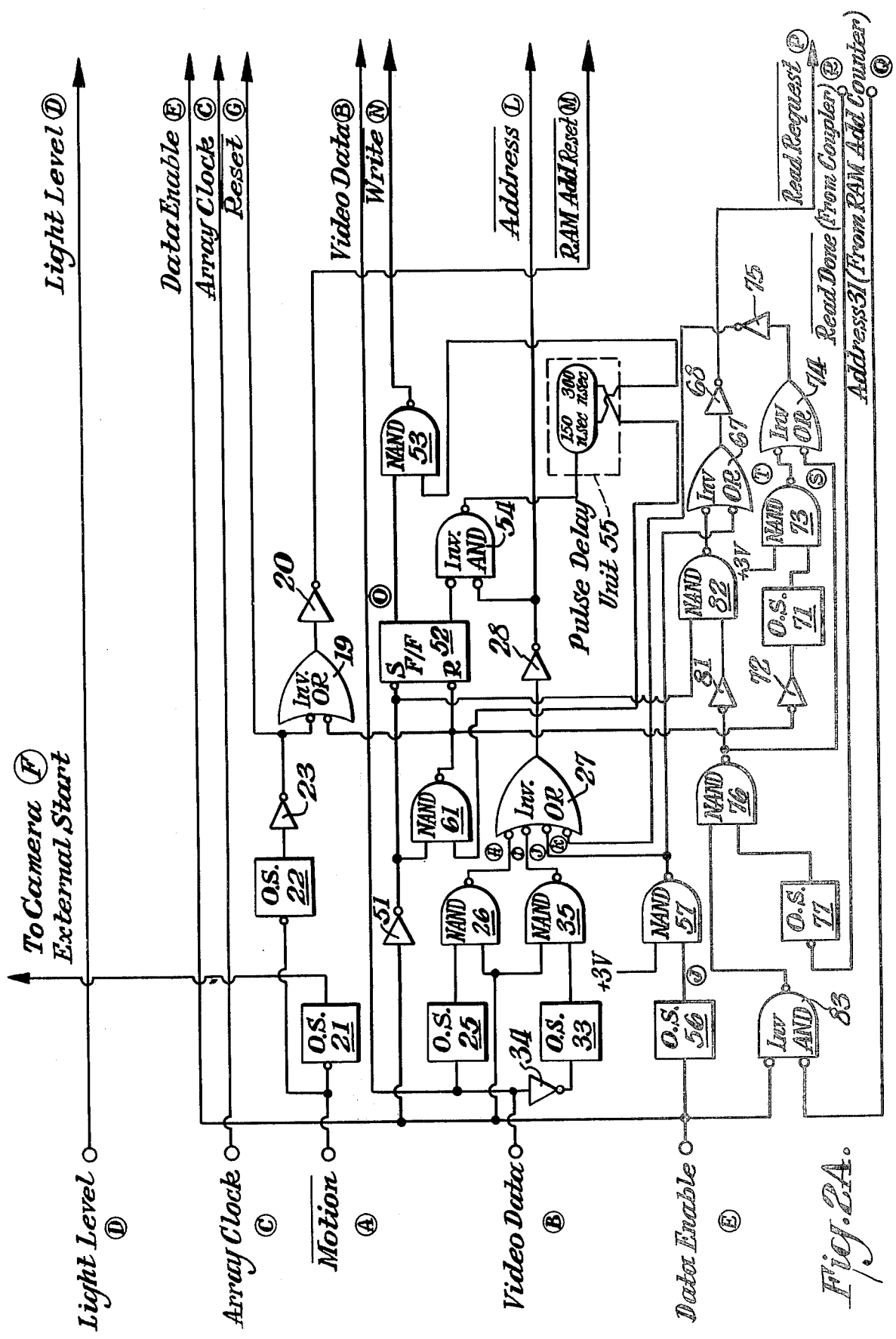
Figure 2B:
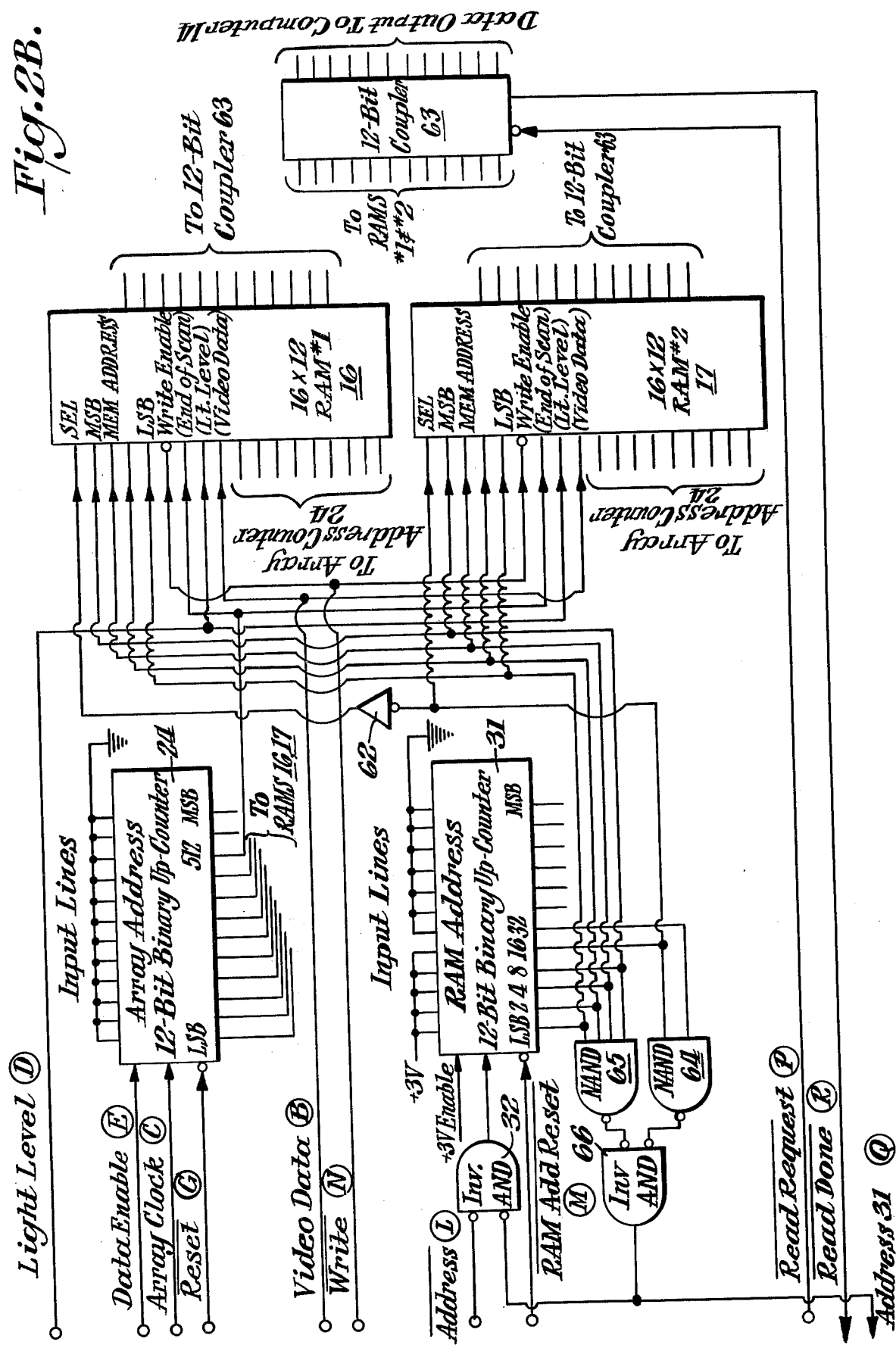
Figure 3B:
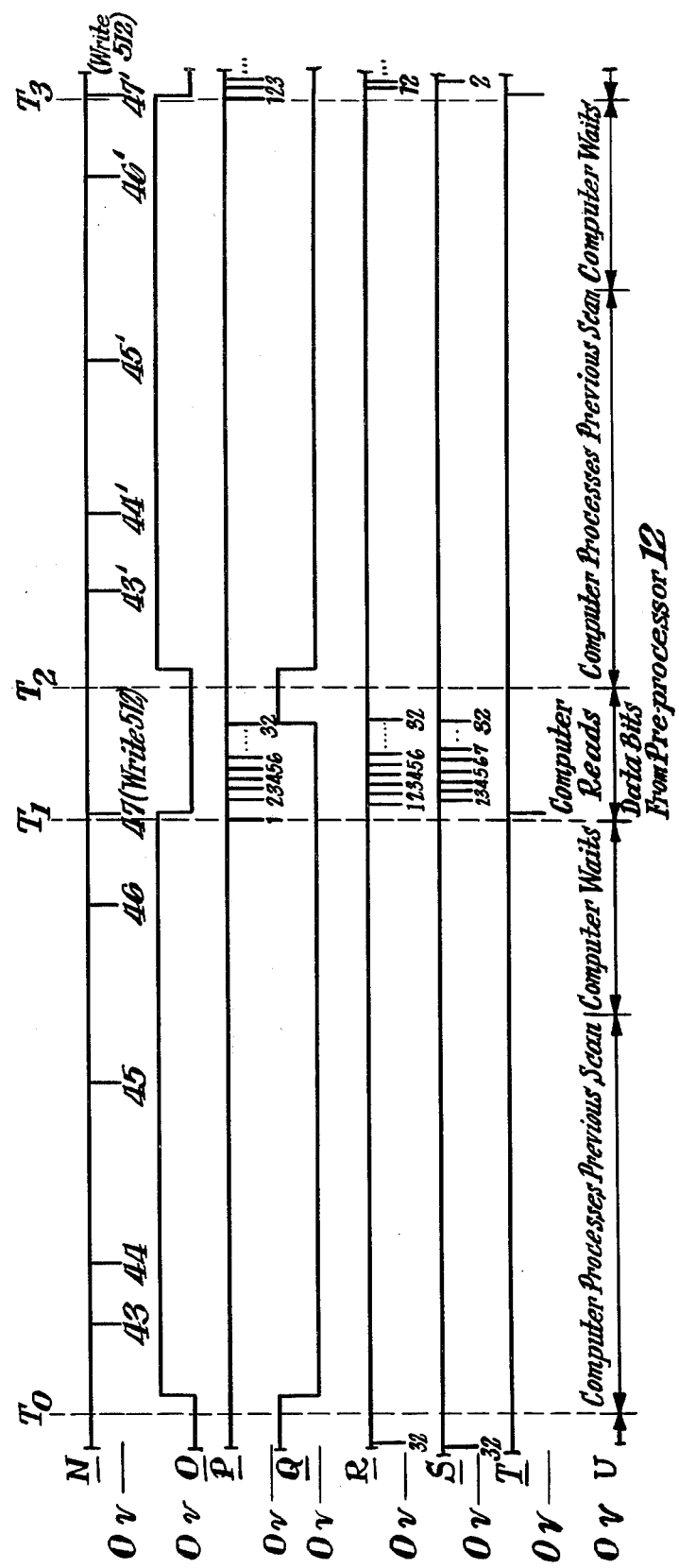
Figure 5:
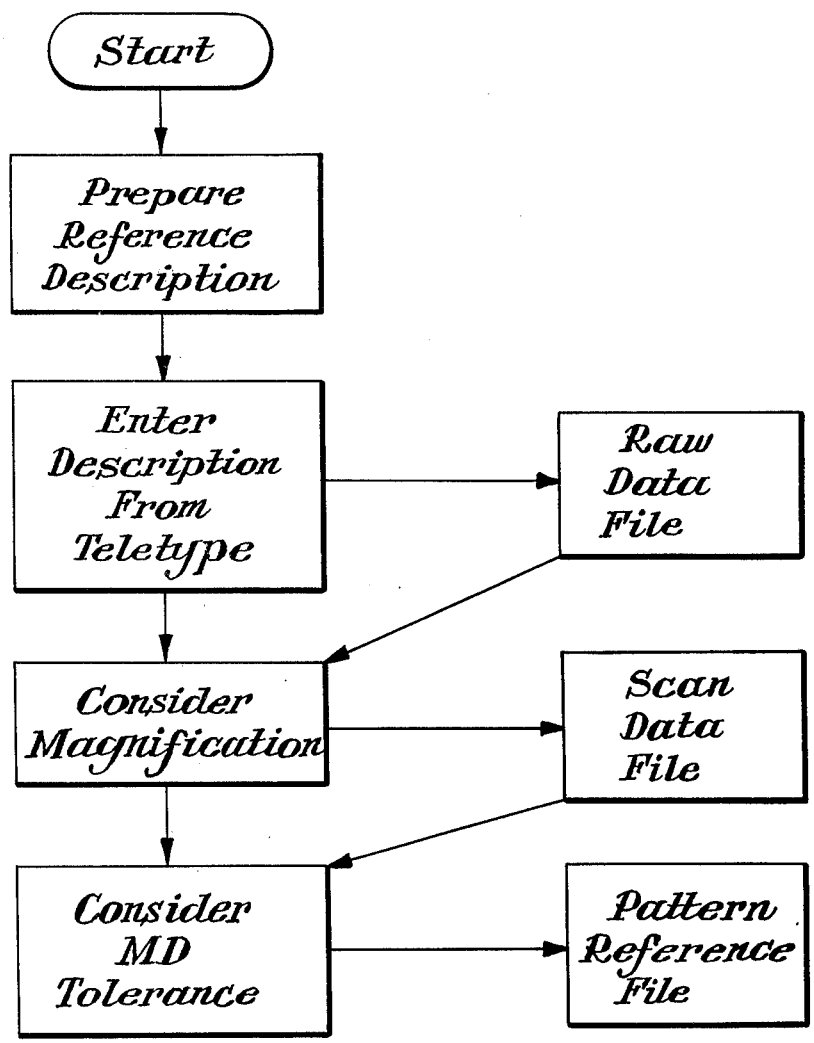
Figure 5A:
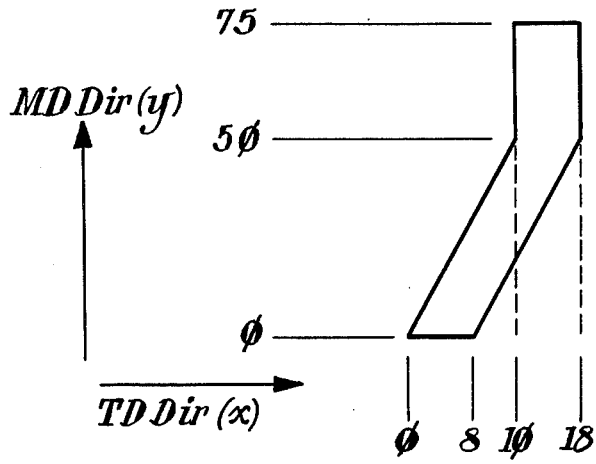
Figure 6A:
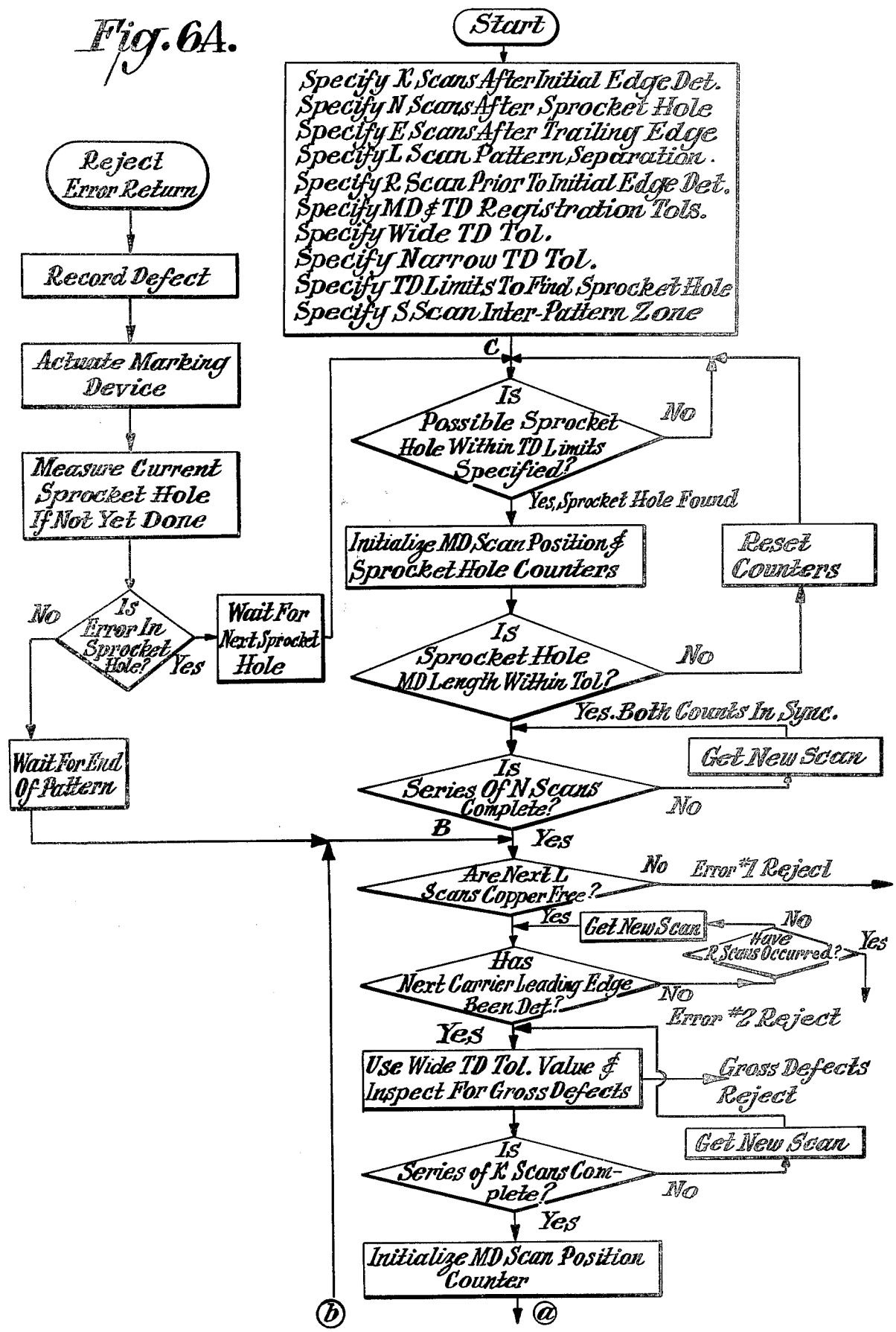
Figure 6B:
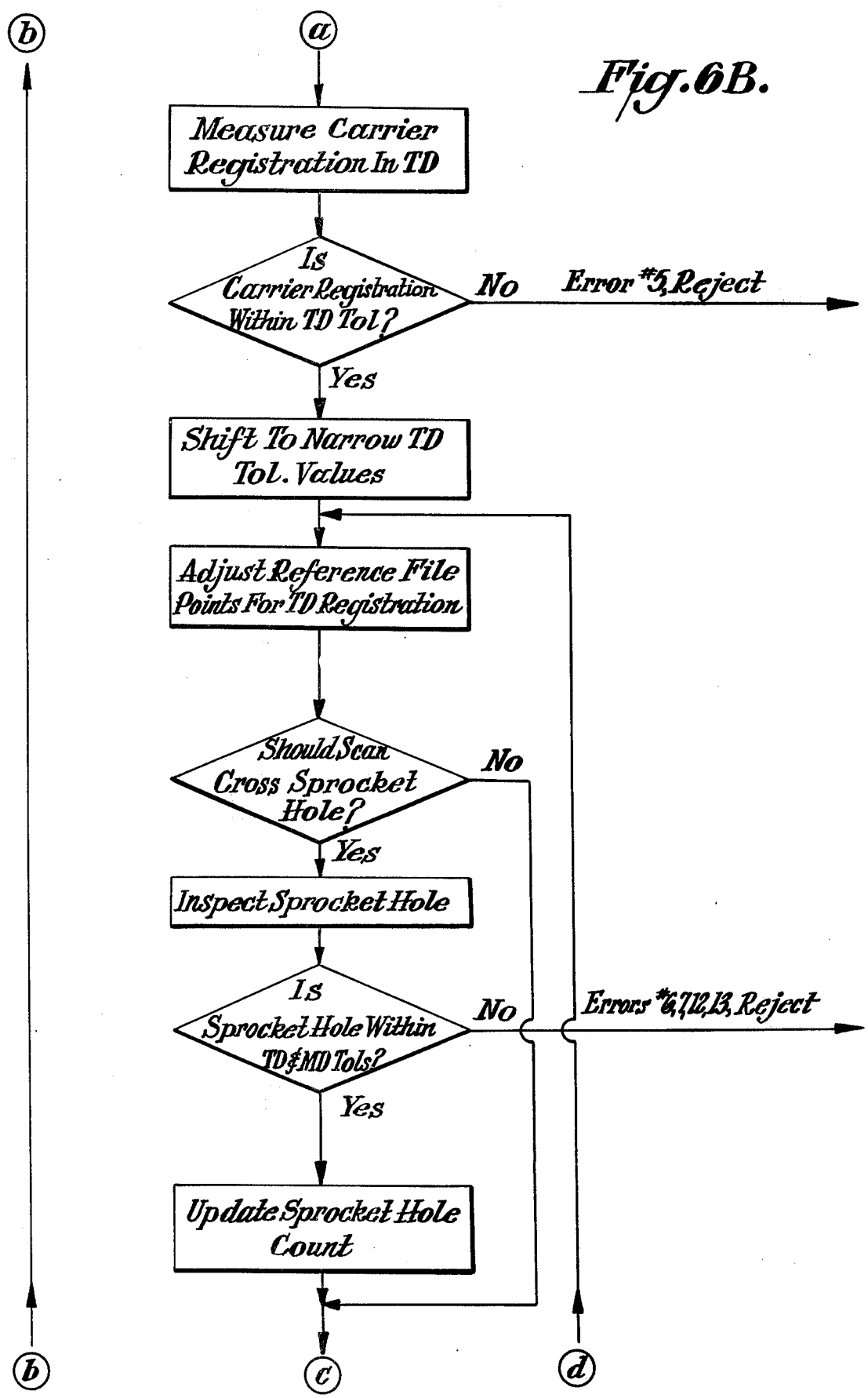
Figure 6D:
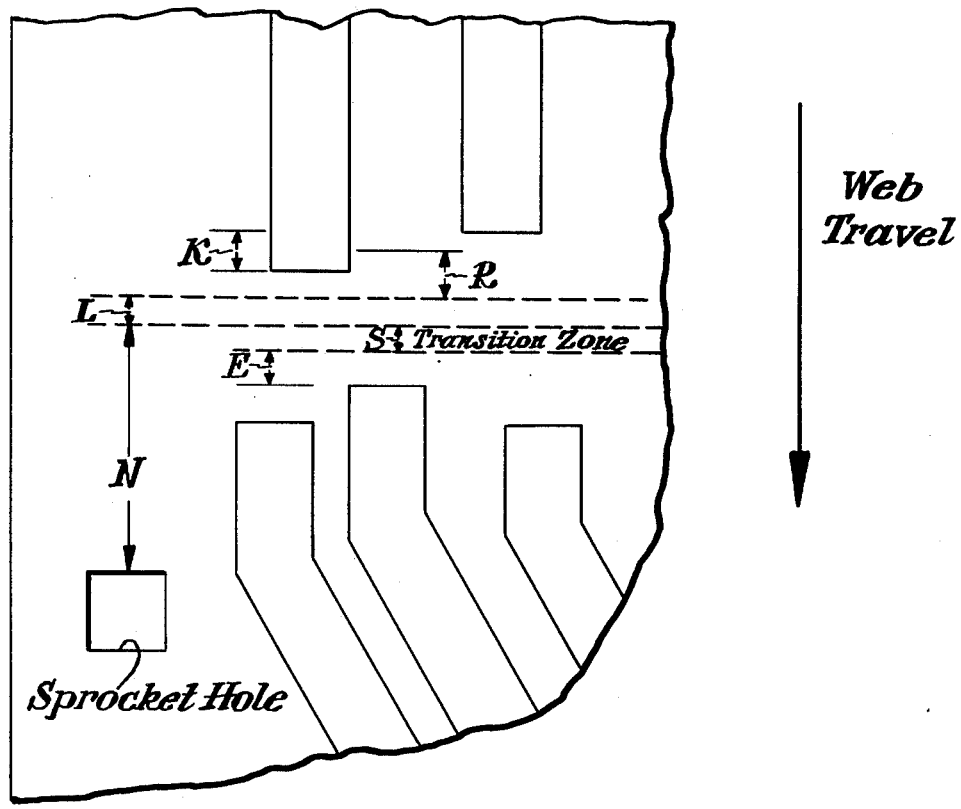
Figure 7A:
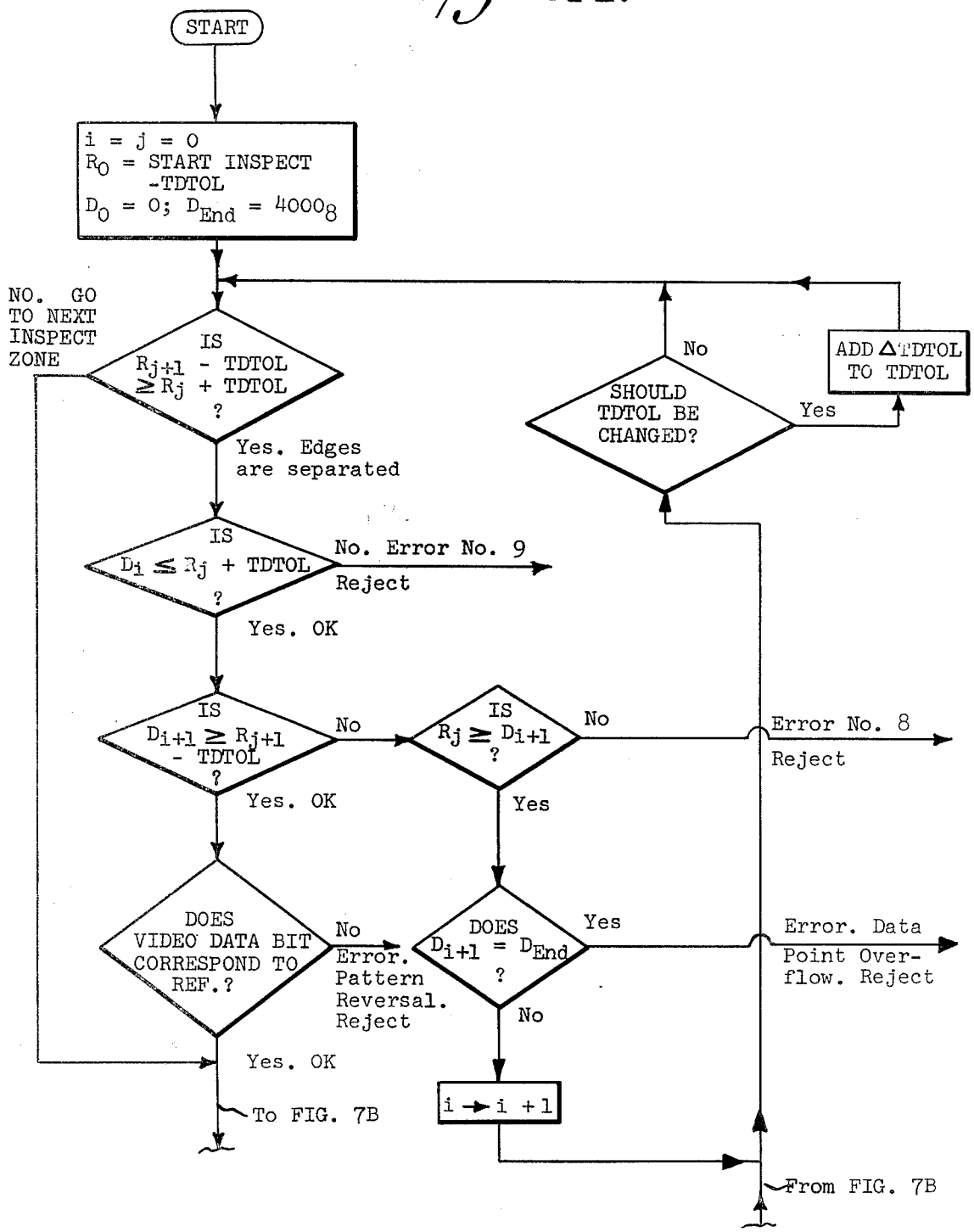
Figure 7B:
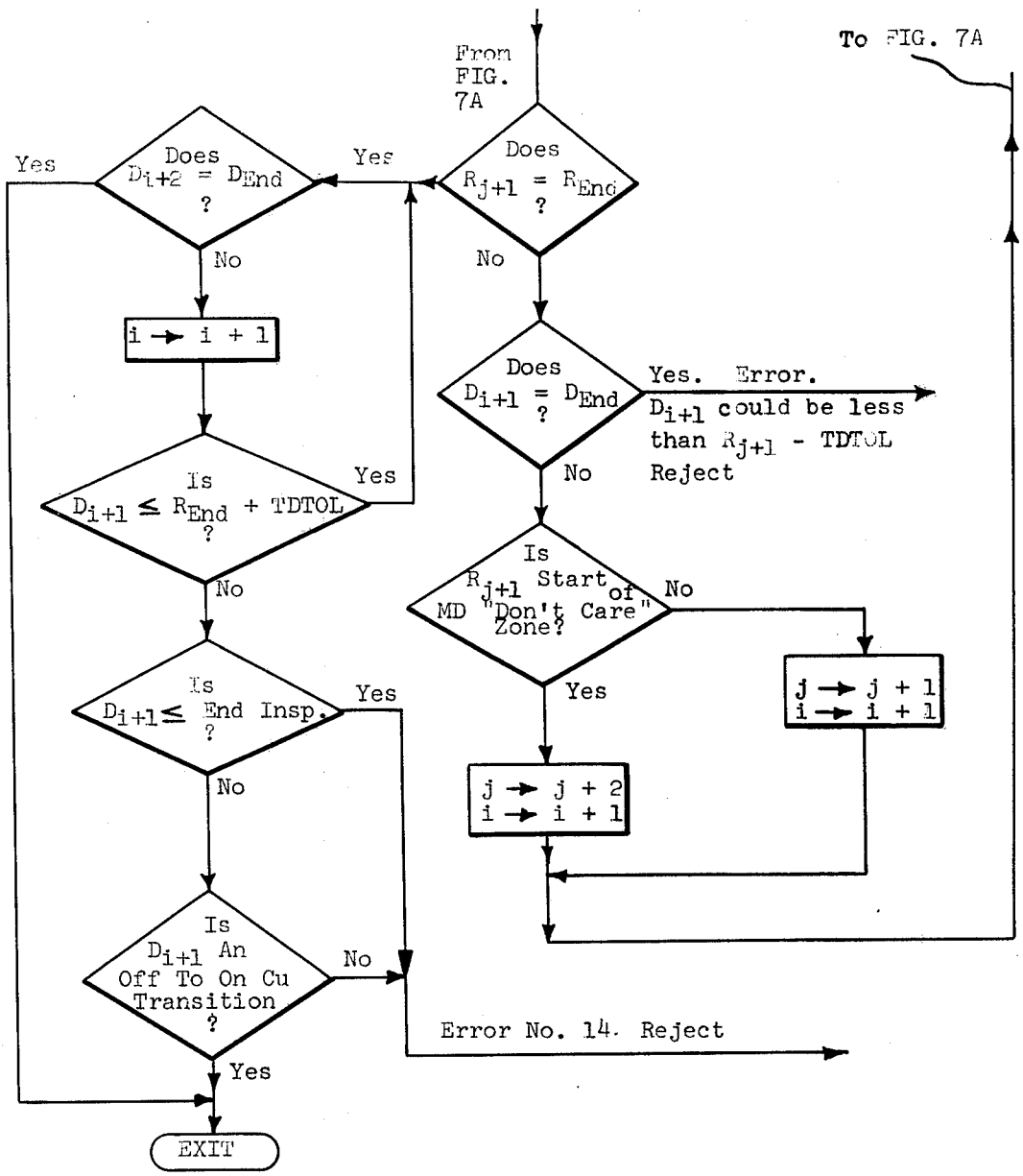

The following drawings constitute part of this specification, in which:

FIG. 1 is a schematic representation of the basic components of the film chip carrier inspection system, FIG. 1A is an enlarged view of a sample strip of 16 mm film bearing the film chip carrier patterns, FIG. 1B is a drawing showing the waveform generated by a typical scan across two film chip carrier leads, FIG. 1C is a drawing illustrating a scan transverse of a typical oversized carrier lead, FIG. 1D is a drawing illustrating a scan transverse of a typical carrier lead displaced in the machine direction, FIG. 1E is a diagram illustrating registration procedures for the apparatus of FIG. 1, FIGS. 2A and 2B, the latter of which is a horizontal extension of FIG. 2A, are schematic diagrams of the computer pre-processor circuitry, FIGS. 3A and 3B, the latter of which is a vertical extension of FIG. 3A, are drawings showing the waveforms corresponding to signals located at points labeled in FIGS. 1, 2A and 2B and depict the operation of the computer pre-processor circuit, FIGS. 4A through 4E are drawings showing the disposition of tolerance zones around typical leads, FIG. 5 is a flow chart showing the software steps used to load from off-line a minicomputer memory with data points defining a master pattern, FIG. 5A is a drawing showing points on a typical lead pattern selected for entry into computer memory, FIGS. 6A through 6C are flow charts showing the software steps used to process on-line the scan information during the inspection sequence, FIG. 6D is a view in enlarged scale of the interpattern inspection zone, FIGS. 7A and 7B constitute a flow chart showing the software steps used to inspect and classify lead defects, corresponding to the dashed portion of FIG. 6C, and FIGS. 8A through 8E are drawings showing schematic representations of typical lead defects.

SYSTEM COMPONENTS

For the preferred embodiment hereinafter described, a running web is under inspection, it being understood that the invention is, of course, equally applicable to the inspection of a non-moving web in which the distance between adjacent scans is determinable.

FIG. 1 shows the basic components of the system in which an intense, wide bandwidth light source, 1, such as a quartz-iodide lamp, is used to illuminate a moving 16 mm polymeric (e.g., a polyimide) web strip product 2. FIG. 1A shows a segment of this product in enlarged scale, and also illustrates the size relationship of a typical copper-lead pattern which has been repetitively embossed into the web substrate at an earlier stage in the manufacturing process, uch as described in U.S. Pat. No. 3,968,563, as well as the spatial relationship of the web sprocket holes 2c, 2c' to the carrier lead patterns. It is seen that, whereas the carrier web base (drawn in plan convention as a transparent material) provides support for the copper film chip carrier leads 2a, which are typically 15 mils (about 0.4 mm) wide at their widest points, the end portions of these leads are quite narrow and extend unsupported into the substrate-free central apertures 2d and 2b, provided for later reception of integrated circuit chips and lead frames, respectively, and thus are susceptible to displacement from their designed positions. It will be hereinafter shown how the inspector distinguishes this latter defect from the several other detectable defect classes.

The apparatus of this invention can utilize image sensors broadly as the electro-optical inspection means, and can rely upon either reflected or transmitted radiation for detection modulation. However, for purposes of explanation, and as shown in FIG. 1, a line scan camera 3, typically a Reticon ® 512 photodiode model LC200, is used to detect reflected illumination through camera lens system 4, which contains the optical components necessary to: (1) magnify the image sufficiently to cover the extent of the camera linear diode array and (2) accentuate the contrast between the "on-off" copper and "off-on" copper transition points to enhance lead edge definition. Since the particular polyimide substrate described transmits only red wavelengths, and the Reticon ® camera detects radiation into the blue wavelengths, a blue optical filter is preferably used with either the source or camera optical elements to suppress the unwanted red wavelength reflectance from the non-copper surfaces.

The web transport arrangement includes constant speed driver drums 5, 5' and idler drums 6 and 6', all of which are provided with teeth to engage the web sprocket holes and thereby positively advance the web through the inspector, and over inspection drum 7, which rolls freely. A band of black felt material secured over the full periphery of drum 7 serves two purposes: (1) it provides sufficient contact friction between the inspection drum and the web riding over it to rotate the motion encoder 11 shaft without slip and without marring the product surface, and (2) it provides a contrasting background for scans across the copper leads hereinbefore mentioned. It addition, a thin strip of radiation reflective material, such as adhesive tape, can be affixed to a peripheral portion of the cylindrical surface, in order to provide contrast for the sprocket holes in the event that these are used for image registration purposes as hereinafter described.

Motion encoder 11, typically a 36,000 pulse per revolution unit, Dynamic Research Corp. Model 32-10-B14 9000 E, is coaxially attached to the inspection drum 7, and, as it turns with the drum, produces motion pulse signals used to establish precise product position in the machine direction to an accuracy of about 1 mil. (0.025 cm.).

A computer pre-processor circuit 12 electrically connects the line scan camera 3, and motion encoder 11, with a minicomputer 14. As will be hereinafter detailed with reference to FIGS. 2A, 2B, 3A and 3B, the computer pre-processor circuit 12 converts the input signals depicted in FIG. 1B to a form needed for subsequent data comparison in minicomputer 14. Finally, conventional marking device 13 (not further described) operates upon receipt of a REJECT signal from minicomputer 14, to mark, stamp or destroy those film chip carrier patterns not passing inspection.

Although minicomputer 14 is shown as a component of the preferred embodiment, microprocessor (e.g., a microcomputer) units having programmable memories are equally adapted to this inspection task. However, in order to show specific flow charts needed to operate the system, these have been described with reference to a Digital Electronics Corp. PDP 8/E computer, which is a model widely used throughout industry.

An input-output element 15, such as a teletype, communicates with the minicomputer and permits the entry of program instructions, tolerances and pattern contour points and also reads out both the location and the type of specific defect conditions detected in a readable format. A recorder records minicomputer programs and results of inspection.

INSPECTION STRATEGY

Before describing the components of the logic, timing and gating circuitry of the computer pre-processor block 12, a brief overview of the inspection strategy which is used is helpful, assisted by the showings of FIGS. 1 and 1B.

As the moving web strip substrate 2 passes through the camera field of view, the charge appearing on each of camera 3's individual photo-diodes 8 in linear array during any given scan represents either an "on", an "off" or a "partly on" copper point. FIG. 1B shows the camera diode linear array oriented transversely across the images of two typical leads A and B. By appropriate thresholding, the video data signal contains pulses whose time scale widths correspond to the spatial distance between the "full off-to-full on" copper or "full on-to-full off" copper transition points in the scan. These are denoted by dashed vertical lines in FIG. 1B.

It is evident that, since the interdiode spacing in the array is known, then the lead widths in the scan direction are also determined, provided that the magnification of lens system 4 is also known. Similarly, since scan spacing in the machine direction is known, the extent of the lead configuration in a direction normal to the scan direction is determinable. After using a registration procedure, hereinafter detailed, to locate the scan starting point consistently at a known position on each inspected pattern, the problem then remains only to compare, on a scan-by-scan basis, the addresses of the diodes signaling the transitions, such as No. 11, No. 17, No. 22 and No. 31 (FIG. 1B), against the reference addresses stored in computer memory for the corresponding scan across a master pattern.

The differences between the addresses of the inspected product transition points and those of the stored reference pattern, if occurring outside prescribed tolerance zones, can then be used to classify and locate a wide variety of defect conditions. For example, the defect of FIG. 1C would be classed as either an oversized or a translated lead in the transverse direction since the transition points on a series of scans across this lead indicate that, although the left-hand and bottom edges are within tolerance, the right-hand edge is outside. The dashed lines indicate the bounds of tolerance (or "don't care") zone referred to the edges of the master lead pattern stored in computer memory. In this example, the tolerance zone consists of one machine direction zone at the lead lower edge and two transverse direction zones, i.e., at the lead left- and right-hand edges. An example of a displaced lead in the machine direction appears in FIG. 1D, which shows the machine direction transition occurring outside the horizontally oriented tolerance (or "don't care") zone, whereas the lead left- and right-hand edges are within tolerance. The following table tabulates the identifying characteristics of some of the more typical film chip carrier lead pattern defects:

| Defect Condition Detected | Probable Cause(s) |
| --- | --- |
| 1. Cu detected too soon after initial scan across pattern. | Oversized or displaced lead in the MD (machine direction). Unwanted Cu blob. |
| 2. Cu detected too late after initial scan across pattern. | Undersized or missing lead. Lead displaced in MD. |
| 3. Cu detected after last scan across pattern. | Discontinuous lead in the MD. Unwanted Cu blob. |
| 4. Pattern exceeds registration accuracy in MD. | Pattern shift in MD. |
| 5. Pattern exceeds registration accuracy in TD (transverse direction). | Pattern shift in TD. |
| 6. Sprocket hole not detected. | Missing sprocket hole. |
| 7. Sprocket hole too wide in TD. | Sprocket hole incorrectly punched. |
| 8. Cu lead left-hand edge detected too far to left of tolerance zone bound. | Oversized or displaced lead in TD. Unwanted Cu blob present. |
| 9. Cu lead right-hand edge detected too far to right of tolerance zone bound. | Oversized or displaced lead in TD. Unwanted Cu blob present. |
| 10. Both left and right-hand edges of Cu lead displaced to left relative to test pattern. | Leftward lead displacement in TD. |
| 11. Both left and right-hand edges of Cu lead displaced to right relative to test pattern. | Rightward lead displacement |
| 12. Right-hand edge of sprocket hole falls outside of tolerance zone in TD. | Sprocket hole incorrectly punched. |
| 13. Sprocket hole too long in MD. | Sprocket hole incorrectly punched. |
| 14. Cu detected between last lead right-hand edge and end of scan. | Unwanted copper blob present. |

The algorithm used to determine these defect conditions is hereinafter described.

COMPUTER PRE-PROCESSOR CIRCUIT

The computer pre-processor circuit 12, shown in detail in FIGS. 2A and 2B, contains gating circuitry, two random access memories (RAMs), and addressing logic necessary to interface camera 3, and motion encoder 11, to the computer 14. FIGS. 3A and 3B show typical waveforms at key locations within the circuit to aid in comprehending its operation.

This circuit serves to assign transverse direction locations to the binary data received from the scanning system and transmit this information to the computer at the completion of each scan where it is then correlated with the machine direction scan position.

The primary binary signal inputs to the computer pre-processor circuit 12 include motion pulses, waveform A; video data pulses, waveform B; array clock pulses, waveform C; light level signals, waveform D; and data enable pulses, waveform E. The motion signals, waveform A, are recurrent low-going pulses representing an increment of product travel in the machine direction, typically 1 mil (0.0025 cm). These pulses are received directly from the motion encoder 11. The remaining four signals are produced by the circuitry of the Reticon ® line scan camera 3.

In those cases where a line scan camera is not used, persons skilled in the art could readily provide a separate system clock and gating scheme to replace the data enable and array clock signals, waveforms E and C respectively, which are conveniently produced by the Reticon ® camera.

The video data signals, waveform B, show the binary signal output when the linear diode array scans the on-copper (logic high) and off-copper (logic low) regions of a pattern such as that shown in AA (FIG. 3A) representative of two quite different product patterns. Array clock pulses, waveform C, produced by a free-running clock internal of camera 3, are used to address the elements of the scanner array and provide the synchronizing signals needed to address RAMs 16 and 17 (FIG. 2B). The light level signal, waveform D, becomes logic high at the point where the signal amplitude of the scanned linear array first exceeds a preselected camera threshold level and returns to its logic low state when the camera 3 receives an external start signal, waveform F, occurring at the beginning of each motion pulse, waveform A. The light level signal, waveform D, provides the inspector operator with the knowledge that sufficient illumination exists for inspection of the pattern about to ensue. Finally, the data enable signal, waveform E, not only controls the length of the camera scan interval across the linear diode array, but is also used to gate the synchronizing array clock pulses C for addressing, on each scan, the bit locations in the two RAMs 16 and 17 corresponding to the photodiode locations in the array. As will be hereinafter described, the brief 226 $\mu$sec computer communication time, or retrace interval, between data enable pulses, waveform E, is used to permit reading-in the loaded contents of RAMs 16 and 17 into computer 14 for address comparison at the conclusion of each scan. In this way, defects which exist are quickly registered and located.

For purposes of this description, the time interval between each motion pulse, waveform A, is separated into two adjacent time periods. The first time period, $T_0$ to $T_1$, consists of the scan interval across the product. Simultaneously, minicomputer 14 compares the data from the previous scan with similar numbers stored in its memory that represent the boundaries of a good part and its tolerance (or "don't care") zones. The second time period, $T_1$ to $T_2$, constitutes the computer communication (or retrace) time. This latter period is used to load the computer with the data accumulated during the immediately preceding time period, $T_0$ to $T_1$. Waveform U shows the sequence of computer operation during two successive product scan periods.

Each pulse in waveform A, produced by motion encoder 11, initiates the first time interval at $T_0$ and simultaneously triggers a 1 $\mu$sec one-shot multivibrator 21 (FIG. 2A) to produce a camera external start signal, waveform F, which in turn causes camera 3 to initiate a data enable signal, waveform E. Simultaneously, the leading edge of each motion pulse, waveform A, causes one-shot 22 and inverter 23 to produce a low logic level reset signal, waveform G, which in turn resets array address up-counter 24 (FIG. 2B) to zero. Simultaneously, reset signal G will pass through inverting OR gate 19 (FIG. 2A) and inverter 20 to reset RAM address up-counter 31, waveform M.

In the course of each camera scan across the product, one-shot 25 senses the trailing edges (the "on-to-off" copper transitions) of the video pulses, waveform B, and produces edge transition pulses, waveform H. NAND gate 26 allows these pulses to pass to inverting OR gate 27 and inverter 28 only in the presence of data enable signal, waveform E. The resulting address pulses 36, 37 (or on the subsequent scan 36', 37') waveform L, are used to increment the RAM address up counter 31 provided the address 31 control signal, waveform Q, is not asserted at the control terminal of inverting AND gate 32 (FIG. 2B). In a similar fashion, after inverter 34 inverts the video pulses, waveform B, one-shot 33 senses their leading edges (i.e., the "off-on" copper transitions) and produces transition pulses, waveform I. NAND gate 35 allows these pulses to pass to inverting OR gate 27 and inverter 28 only in the presence of data enable signal, waveform E, to produce additional address pulses 41, 42 (or on the subsequent scan 41', 42'), waveform L.

Since this embodiment uses only two 16 word RAMs, 16 and 17, no more than 32 transition signals can be stored on each scan. However, there is substantially no limit to the number of RAMs which can be used, dependent on the nature of the inspected product and the number of anticipated transitions encountered in a given scan. For film chip carrier lead inspection, experience has shown that no more than about 20 transitions are typical during any given product scan.

Low logic level WRITE signal pulses 43-47 (and on the subsequent scan 43'-47'), shown in waveform N, enable RAMs 16 and 17 to record the address (diode position) of each of the combined transition pulses in waveform L. As will be evident hereinafter, pulses 47 and 47' which occur within the second time interval, are used to record address number 512 in both RAMs 16, 17 and thereby alert the computer to the fact that no more transitions have been recorded during the foregoing first time interval. Incidentally, should all 32 sequential memory locations be used, the number 512 is written into RAM address 31 on the occurrence of the 32nd transition pulse. The means used to generate the WRITE pulses comprise an inverter 51 (FIG. 2A) which inverts the high logic level data enable signal, waveform E, so that it can set RS flipflop 52 which, in turn, produces a control signal, waveform O, to operate NAND gate 53. Since the lower terminal of RS flipflop 52 is at a logic low level during the first time interval, inverting AND gate 54 allows RAM address pulses, waveform L, to pass to the second input terminal of NAND gate 53 via pulse delay unit 55. This element applies a 150 n sec delay to each of the address pulses in order to synchronize the operation of RAMs 16 and 17 with the signals from array address up-counter 24. WRITE pulses 47 and 47', waveform N, are based on the occurrence of the trailing edge of the data enable signal, waveform E, which is sensed by one-shot 56. The trigger pulse so formed, waveform J, passes through NAND gate 57, inverting OR gate 27, inverter 28 and then splits into two paths. The first path includes inverting AND gate 32 (FIG. 2B) and RAM address up-counter 31 which increments either RAM 16 or 17 to the next word position (provided the address 31, signal Q, event has not occurred). The second path includes inverting AND gate 54 (FIG. 2A), pulse delay unit 55 and NAND gate 53 which passes the 150 n sec delayed trailing edge WRITE signal N to RAMs 16 and 17 since the high logic level control signal still exists at the othe NAND gate 53 input terminal. However, the 300 n sec delayed portion of the trailing edge signal passes through NAND gate 61 and resets RS flip-flop 52 so that a low logic level control signal on NAND gate 53 effectively prevents additional transition pulses beyond the data enable trailing edge signals 47 and 47', waveform N, from being written into RAMs 16 and 17 until the leading edge of the next data enable pulse, waveform E, again sets RS flip-flop 52.

Thus far, each transition occurrence has been stored in one of the two RAMs 16 or 17 with its corresponding 10-bit diode address location. RAM 16 will accumulate the first 16 transition points; then, on the 17th count, inverter 62 (FIG. 2B) will invert the address signal to deactivate RAM 16 and simultaneously activate RAM 17 to accumulate the remainder of the transition counts up to and including a total of 32. Should additional transitions occur, these are superposed in address location 31, since NAND gates 64, 65 with inverting AND gate 66 effectively operate to disable any additional incrementing of address counter 31. In this event, an address 31 pulse would appear in the first time period and remain until the occurrence of the next RAM address reset signal, waveform M, at the end of the scan. The presence of bits in the SEL (Select Line) address input positions in either RAM serve to identify which of the two RAMs is providing the transition words when memory contents are transferred to 12-bit coupler 63, typically a DEC M1703 omnibus input interface unit, since the outputs of the two RAMs are wire-ORed together. RAM input positions labeled MSB (Most Significant Bit), LSB (Least Significant Bit), and MEM ADDRESS contain bits identifying the memory location of each 10-bit diode addressed transition signal. Bit 10, labeled END OF SCAN, is transmitted each time the 512th diode is addressed, and is used to indicate the last word in a given string of transition words and, in effect, tells the computer to disregard any additional transition pulses in the current string transmitted to it through 12-bit coupler 63. Since RAMs 16 and 17 provide for storage of 12-bit words, the remaining two bits are conveniently used to record light level and video data. By knowing the video data status, waveform B, one can determine if the current transition word represents an "off-to-on" copper or an "on-to-off" copper transition; whereas the light level bit obtained from waveform D can be used to indicate whether the sample is adequately illuminated.

It remains now to transfer the transition words stored in RAMs 16 and 17 to minicomputer 14 as controlled by 12-bit coupler 63. As hereinbefore mentioned, this is accomplished at the outset of the second time interval when initiated by the trailing edge of the data enable pulse, waveform E. In addition to generating RAM address pulse 512, waveform L, and WRITE pulse 47, waveform N, the data enable trailing edge signal initiates a low logic level read request command pulse number 1, waveform P, through one terminal of inverting OR gate 67 and inverter 68 to 12-bit coupler unit 63. The computer is programmed to delay reading the first transition word from memory by several microseconds to allow time for writing the last diode address 512 in RAMs 16 and 17 and resetting RAM address counter 31 such that a zero-bit appears in its LSB position. The first RAM address pulse to increment the RAM address counter 31 to the LSB position after reset is produced by having one-shot 71 form a pulse on the trailing edge of the reset signal for flipflop 52 after passing through inverter 72. Once formed, the pulse passes through NAND gate 73, inverting OR gate 74, inverter 75 and inverting OR gate 27, as hereinbefore described, to form address pulse 1, waveforms K and L.

After computer 14 completes reading the first transition word from RAM 16, it transmits a read done pulse 1, waveform R through 12-bit coupler 63 to one-shot 77 to initiate the next read request pulse 2, waveform P, and increment the RAM address counter 31 so that the next transition word is readied for transmission to the computer. This is accomplished in the following manner. After the first read done pulse, waveform R, passes from one-shot 77 through NAND gate 76, it travels along two paths. The first path passes the signal to a second terminal of inverting OR gate 74, which appears as pulse 2 in waveform S, and travels via inverter 75 through inverting OR gate 27 (FIG. 2A) to become RAM address pulse 2, waveform L, as previously described. The second path passes the read done pulse through inverter 81 and NAND gate 82 to the second terminal of inverting OR gate 67. The output signal of this gate passes through inverter 68 and forms the second read request pulse, waveform P.

This sequence of events continues until RAM address up-counter 31 has been incremented to address 31, which produces a high logic level address 31 pulse, waveform Q, at the output of inverting AND gate 66. Since this signal deactivates inverting AND gate 83, NAND gate 76 and inverting AND gate 32 (FIG. 2B), the read done signal pulse, waveform R, is no longer able to initiate read request commands or increment address counter 31. Consequently, no more transition words are read into the computer until the next computer communication time interval. The manner in which the transition words are used in the inspection system will be described next.

ALGORITHMS

Implementation of an inspection algorithm for perfectly manufactured parts is straightforward and easily understood. Referring to FIG. 4A, which depicts a perfect lead, it is only required for the lead under test to have an "off-to-on" copper transition at identically point $P_1$ and an "on-to-off" copper transition at location $P_2$. Given a master drawing for a perfect part, theoretically it would only be necessary to enter the P values for all possible scans as a reference and then compare scans from the part being inspected against this reference. Any deviation in the P values of the part being inspected from the reference would constitute a defective part.

Such a simple algorithm is not practical for the inspection of film chip carriers or, in fact, manufactured parts in general. Normal manufacturing tolerances permit some variation in the lead geometry from the ideal. Excursions outside these tolerances constitute defects. Prescribed lead tolerances can be represented graphically as shown in broken line representation in FIG. 4B.

FIG. 4C shows what a manufactured lead can look like and yet still be considered acceptable with respect to the tolerances identified. Note that application of a tolerance to the ideal lead infers three inspection zones, where zone 1 constitutes an area where copper must not be found, zone 3 represents a zone where copper must be found, and zone 2 constitutes a "don't care" zone wherein it is immaterial whether copper is present or not present. The algorithms described for this invention utilize this three zone concept.

Implementation of the three zone concept requires modification of the P parameters described in FIG. 4A to take into consideration the tolerance zones. Tolerance zones can be easily implemented when scanning across leads oriented orthogonally to the scan direction, but require considerably more complexity in scanning near leads oriented in the scan direction.

In the case of lead edges oriented orthogonally to the scan direction it can be seen, by reference to FIG. 4D, that the goodness of fit of this lead can be evaluated by subtracting the tolerance value from the perfect lead location value, and verifying that the device being inspected has an edge transition value that falls between these two extremes. For the example shown in FIG. 4D, the edge value of the part being inspected, $P_L$, must satisfy the inequality, where $P_1$ is the perfect lead:

$$P_1 - \Delta T_{TD} \leq P_L \leq P_1 + \Delta T_{TD}$$

These calculations are straightforward and can be executed rapidly in a general purpose computer.

However, inspection of lead edges that are essentially parallel to the scan requires the manipulation of considerably more reference points. As shown in FIG. 4E, the scan occurring just prior to the perfect lead location encounters copper in the lead under test. Note that a perfect part for this scan would indicate no copper at this TD location. To determine if this copper presence is acceptable, it is necessary to examine reference scans up to a distance equal to the tolerance on either side of the present scan line. If the values of the reference scans allow either copper or no copper within this zone, then it is a "don't care" zone and the copper detected is acceptable. If, however, none of the values of the reference scans show copper, then it is a no copper zone. And lastly, if all of the values of the reference scans examined show that copper should be present, then it is a copper zone. Thus, to determine the acceptability of lead edges oriented in the direction of the scan, the computer would have to search through its memory all possible references in the tolerance zone to reach a decision on product acceptability.

With the present state of the art in computer technology, it is not possible to check the quality of lead edges oriented with the scan at speeds required for on-line inspection of film chip carriers (typically <1 second/device). An important element of this invention is the use of two algorithms, an off-line algorithm and an on-line algorithm which, in combination, permit accurate determination of the acceptability of all orientations of lead edges at on-line speeds.

OFF-LINE ALGORITHM

A flow chart for the off-line algorithm is shown in FIG. 5. It permits one to enter into the computer the defining characteristics of the pattern to be inspected directly from a design drawing and in combination with stated machine direction tolerances. The end result is to generate a pattern reference data file that constitutes the location of copper zones, no copper zones and "don't care" zones for the machine direction tolerances. The off-line algorithm is executed only once for a given pattern and set of machine direction tolerances.

Preparation of the reference proceeds as follows: a drawing of a perfect carrier is overlaid with a grid of rectangles where each intersection in the grid represents one diode of resolution. From the drawing, equations are written that define each portion of a piecewise continuous function that describes the pattern edges. For example, in FIG. 5A the lead edges are best described using four linear equations of the form:

$$Y - Y_O = \frac{\Delta Y}{\Delta X} (X - X_O)$$

These equations define the lead edge transitions over a machine direction distance of 0–75. The equations are entered into the off-line algorithm along with the MD count interval over which they represent the respective lead edges. A new equation must be used each time a change in the position of a reference transition point in an adjacent scan line has not been predicted by the previous equation. An example of the raw data entered corresponding to the lead shown in FIG. 5A is as follows:

| Equation Set | MD Count Interval | Equation Coefficients | | | |
|---|---|---|---|---|---|
| | | $X_O$ | $Y_O$ | $\Delta X$ | $\Delta Y$ |
| 1 | 0, 50 | 0 | 0 | 10 | 50 |
| | | 8 | 0 | 10 | 50 |
| 2 | 51, 75 | 10 | 0 | 0 | 25 |
| | | 18 | 0 | 0 | 25 |

The off-line algorithm in turn manipulates these equations to produce the edge P values for the perfect pattern corresponding to a given MD count. For example, in the MD count interval 51 to 75, the algorithm would determine that the ideal pattern would begin copper at TD position 10 and leave copper at TD position 18.

Returning to the flow chart of FIG. 5, the operator next enters the scale factor between the design drawing measurements and the magnification of the inspector optical system. Next, the appropriate machine direction tolerance is entered. At this point, the off-line algorithm determines the machine direction "don't care" zones, compensates for system magnification and outputs a pattern reference file that describes the reference, "blurred" in the machine direction, as a function of the size of the MD tolerance.

The off-line algorithm could include the calculations necessary to take into consideration the transverse direction (TD) tolerance as well; however, it is more convenient to implement this in the on-line software. On-line implementation facilitates changing the TD tolerance as a function of position in the machine direction. In the case of film chip carrier leads aligned in the machine direction, tighter TD tolerances can then be applied to the narrow fingers in the center of the pattern, whereas looser tolerances can be applied to the leads at the extremities of the carrier.

ON-LINE ALGORITHM

The on-line algorithm provides the computer with a set of instructions which it needs to process the transition point data received from computer pre-processor circuit 12 after each scan. This is accomplished by comparing this data with the reference file data developed by the off-line algorithm, and, for differences falling outside of tolerance, producing error signals which can then be used to identify the defect condition and reject defective patterns.

FIGS. 6A and 6C show, in vertical progression, a set of on-line software steps providing effective flaw-detection and classification capability for the system. At the outset, after specifying the TD limits within which the sprocket hole must be detected, the first objective is to find the first sprocket hole having a length dimension in the machine direction that is within tolerance. The occurrence of this event is used to initiate two separate up-counting routines in the computer: namely, a sprocket hole count and a machine direction (MD) scan position count, both of which are incremented together with the occurrence of each motion pulse event. After both counters are initialized, the sprocket hole count is used to tell the inspection system when the next sprocket hole should be detected, and forms an MD registration reference, as hereinafter detailed, provided the dimensions of the immediately preceding sprocket hole fall within tolerance. The MD scan position count identifies the MD location of the scan line relative to the pattern.

Referring to FIG. 6D, the last of a series of N scans, after counter initialization, signals the commencement of the inspection of the next carrier lead pattern. After this event, the next series of L scans is used to determine whether the first detected lead of the new pattern is oversized or has been displaced in the machine direction or a Cu blob is present. Any of these conditions, identified as Error No. 1 and corresponding to defect condition No. 1 from the table supra, will produce a Reject signal. In a similar fashion, the failure of the system to detect the first lead within the next series of R scans signals Error No. 2, which corresponds to defect condition No. 2 (i.e., displaced, undersized or missing lead). Provided that no defects appear up to this point, and the first carrier lead edge has been detected within the maximum R scans, a wide TD tolerance value is used to detect gross defects at the lead extremities and establish TD registration points in a manner hereinafter detailed. A short delay of K scans is used to avoid the unevenness of the lead edge oriented in the scan direction when basing the initialization of the MD counter and registration measurement on the occurrence of the first scan which crosses the end of the first lead of the new pattern.

Referring back somewhat, the importance of determining accurately the position and dimensions of at least one sprocket hole per pattern in film chip carrier inspection is that sprocket holes are conveniently used as registration references throughout the fabrication steps of the carrier pattern, as detailed in U.S. Pat. No. 3,968,563. Consequently, a sprocket hole is an excellent reference point for the inspection of carrier lead patterns. However, there is no reason why any other consistent point on, or near, the pattern to be inspected cannot be used just as well.

Referring to FIG. 1E, which shows a perfectly general assumed lead pattern, registration inspection is conducted for individual product frames as follows:

X and Y axes are chosen from the reference pattern stored in the computer, conveniently at a point 0 in FIG. 1E, wherein Cu is first encountered in both the X and Y directions.

The sprocket hole counter is set to start counting at this zero origin.

As transverse counting ensues, a convenient lead, such as the middle lead $L_2$ of FIG. 1E is employed as reference, its left- and right-hand edges being determined in a transverse sense over the full length course of scan duration, then averaged by dividing by two so that the vertical center line determined by successive transverse scans is verified. This gives the X value of the actual product pattern in terms of diode counts; i.e., the actual $C_3$ extent, for which the reference $C_3$ of, typically, 200, is known.

Similarly, after the continued scanning encounters the right-hand edge of a sprocket hole $S_1$, the reference value of $C_1$ (typically equal to 60) being known, a sensed determination for the corresponding transverse spacing gives a product value of $C_1$ which, when added to the determined product value of $C_3$, gives a total ascertained photodiode count which is the actual transverse dimension from the sprocket right-hand edge to the center line of lead $L_2$.

To insure that the diode array overlaps the sprocket holes' right-hand edges during every frame scan, the scan is deliberately initiated well to the left of the right-hand edge of the first sprocket hole $S_1$ examined. (This overlap value is filed in computer memory, so that it is assumed to remain in the same relative position through successive frames, unless, of course, the sensed value differs as scanning proceeds.)

Now, unless the scan-determined center line minus the overlap is within the corresponding reference registration total $[(C_1+C_3)=$ the allowable transverse direction registration tolerances], the product is rejected as outside transverse direction standards and inspection of the pattern terminates. This defect condition is labeled Error No. 5 in FIG. 6B.

Should the TD registration be within tolerance, all of the reference file edge transition points of the lead pattern are updated by this difference. Then, after shifting to the specified narrow TD tolerance value, the system continues to inspect the pattern in accordance with the algorithm shown in FIGS. 7A and 7B, indicated generally as the dashed box in FIG. 6C, described infra. For scans crossing sprocket holes, the system identifies those which are either incorrectly punched or missing and produces Error signals Nos. 6, 7, 12 or 13 as a result of an inspection routine which uses an algorithm analogous to that of FIGS. 7A and 7B. The existence of any of these errors will discontinue the inspection sequence and cause the system to locate the next valid sprocket hole and resynchronize the two counts before pattern inspection resumes.

Provided that the sprocket hole passes inspection, the sprocket hole count is updated in order to ensure that the vertical registration of the pattern in the machine direction is based on the most current knowledge of this reference position.

Vertical registration determination in the machine direction is effected by starting machine direction counting after a predetermined number of K scans are completed after Cu is first encountered in the course of MD scanning and then comparing this count with the sprocket hole count at the end of the pattern. Thus, the difference between the sprocket hole count, which is based on the position of the most recent valid sprocket hole, and the machine direction count is the vertical offset of the product with respect to the reference. If this off-set exceeds the reference value plus vertical tolerances, the product is rejected as outside machine direction standards, Error No. 4 (FIG. 6C). Consequently, it is not necessary to effect mechanical registration in order to inspect for registration acceptability in the X and Y directions.

Referring again to FIG. 6D, at the completion of MD registration, a series of E scans are used to determine the presence of Cu within the region between the lead ends on the carrier just inspected and transition zone S, which is provided to facilitate the assignment of defect-related signals occurring in the interpattern region to one or the other of the adjoining patterns.

The appearance of an Error No. 3 signal indicates either a discontinuity in the last inspected lead or the presence of a Cu blob. The width of transition zone S is specified by allowing S scans to occur before commencing the inspection of the next pattern at the end of the series of N scans.

Although not shown, the occurrence of an Error signal at any stage in the on-line algorithm causes the system to halt further inspection of the pattern and return to either point B or C (refer to FIG. 6A) in the algorithm to await the occurrence of the next pattern or sprocket hole, as the case may be. However, the algorithm may be modified to allow more than one Error signal to occur in any given scan or group of scans in order to further classify the nature of the defect. This will become clear when the representative lead defects shown in FIGS. 8A–8E are classified according to the inspect pattern routine of FIGS. 7A and 7B.

Figure 8A:
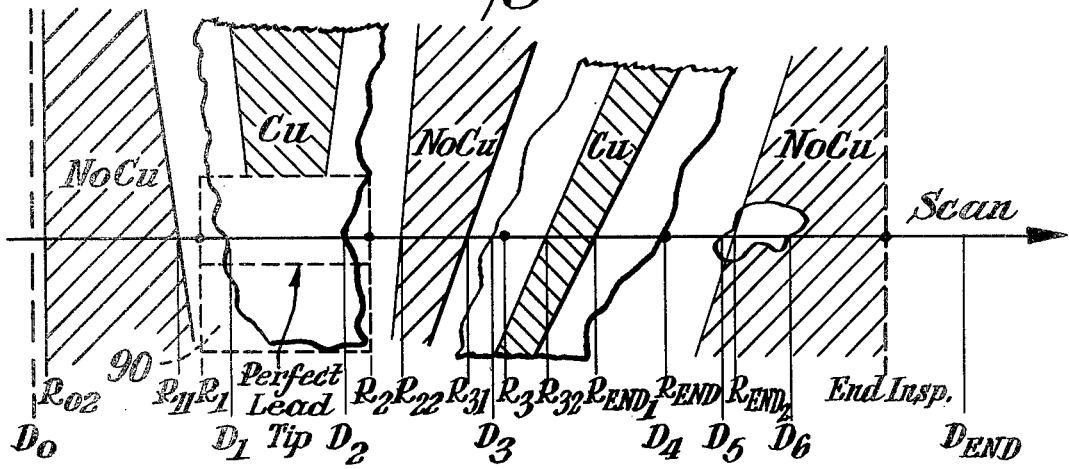

The object of the inspect pattern routine of FIGS. 7A and 7B is to identify the occurrence and nature of lead pattern defects by making certain comparisons between a 12 bit binary data word and a corresponding 12 bit reference word. A typical word list for the scan crossing the pattern shown in FIG. 8A is as follows:

| DATA WORD LIST | | | | | REFERENCE WORD LIST | | | | | |
|---|---|---|---|---|---|---|---|---|---|---|
| Data Word | End of Data | Light Level | Video Data | TD Position (9 bit) | Ref. Word | End of Scan | MD Don't Care | Video Data | TD Position (9 bit) | ΔTD TOL |
| $D_0$ | 0 | 0 | 0 | $d_0 = 0$ | $R_0$ | 0 | 0 | 0 | START $r_0$ = INSP. | — |
| $D_1$ | 0 | 1 | 1 | $d_1$ | $R_1$ | 0 | 1 | 1 | $r_1$ | — |
| $D_2$ | 0 | 1 | 0 | $d_2$ | $R_2$ | 0 | 1 | 0 | $r_2$ | — |
| $D_3$ | 0 | 1 | 1 | $d_3$ | $R_3$ | 0 | 0 | 1 | $r_3$ | — |
| $D_4$ | 0 | 1 | 0 | $d_4$ | $R_{END}$ | 1 | 0 | 0 | $r_{END}$ | +2 |
| $D_5$ | 0 | 1 | 1 | $d_5$ | | | | | | |
| $D_6$ | 0 | 1 | 0 | $d_6$ | | | | | | |

-continued

| DATA WORD LIST | | | | | REFERENCE WORD LIST | | | | | |
|---|---|---|---|---|---|---|---|---|---|---|
| Data Word | End of Data | Light Level | Video Data | TD Position (9 bit) | Ref. Word | End of Scan | MD Don't Care | Video Data | TD Position (9 bit) | ΔTD TOL |
| $D_{END}$ | 1 | 1 | 0 | $d_{END}$ | | | | | | |

Note that the format of the data word consists of the following information: 9 bits of TD position data, and 3 auxiliary bits (Light Level, End of Data and Video Data). The reference word format is comparable, except an MD "don't care" bit replaces the Light Level bit in the former. This bit normally appears in those reference words which define lead transition points adjacent to lead edges oriented parallel to the scan directon as derived in the off-line program. A portion of a lead end copper zone which would be described by reference words containing MD "don't care" bits is shown as a dashed rectangle in FIG. 8A. In this figure, as in the remaining FIGS. 8B–8E, TD "don't care" zones separate the hatched alternating Cu and no-Cu inspection zones and have widths which are determined by the size of the TD TOL (tolerance) values. Where the single subscript on $D_i$ or $R_j$ refers to the order of the occurrence of the data word or reference word in the list, there is used the double index subscript R values to represent the major and minor extremes of the TD "don't care" zone about the $R_j$ values in order to facilitate understanding the flow chart of FIGS. 7A and 7B.

Returning to FIG. 7A, the algorithm begins by establishing the left-most point on the scan where inspection must commence, initializes the i and j indices, and adds a $D_0$ (Data)=0 word to the data word list.

The first decision block asks if there is an overlap in the bounds of two adjacent TD "don't care" zones. For example, where $R_n$ denotes Reference, is $R_{11} \geq R_{02}$?. If this condition is not satisfied, a TD "don't care" zone would be superposed over a Cu or non-Cu inspection zone and inspection of this zone is not required. The algorithm then bypasses this inspection zone and goes on to the next. However, since FIG. 8A shows that the edges of the TD "don't care" zones are adequately separated, inspection of the first non-Cu zone can continue.

Figure 8B:
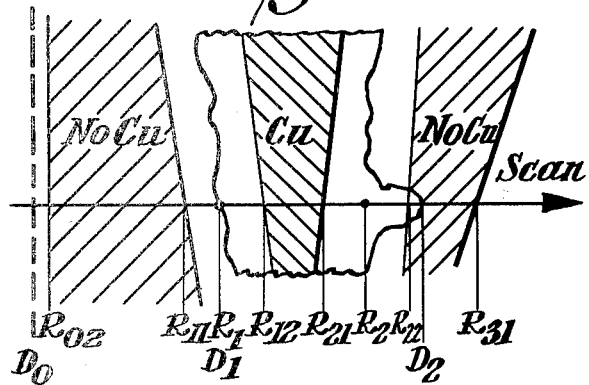

The next block asks whether the data point value is less than the associated reference value plus TD tolerance. If not, an Error No. 9 signal is produced. FIG. 8B shows the case where the right edge of an oversized lead extends into a no-copper zone. The algorithm interprets this as an Error No. 9 defect.

Figure 8C:
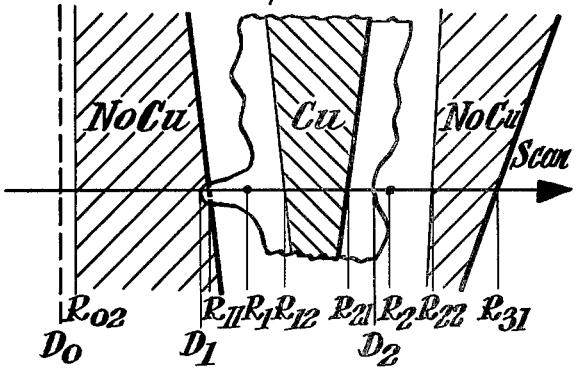

The next block asks if the next data point value is greater than the associated next reference value minus TD tolerance. FIG. 8C shows the case where the left edge of an oversized lead extends into a no-copper zone, which would initiate an Error No. 8 signal. Note that a provision is made to increment the data points through the routine until $D_{i+1} > R_j$, or until a data overflow condition is reached in order to compensate for the large number of data words which might appear between two adjacent reference words. Such a condition arises, for example, if a number of small bits of copper are detected in a "don't care" zone, as these generate data words, but would still not constitute rejectable defects.

The next test determines whether the Video Data bit in the data word corresponds to that in the reference word. If not, a reversal of the copper with the non-copper inspection zones is indicated, and the carrier fails inspection.

Provided neither $D_{i+1}$ nor $R_{j+1}$ are the last words in the list, both indices are incremented by one unless an MD "don't care" bit is present. In this case, the data words are incremented by one, but the reference words are incremented by two. The reason for this can be seen by reference to FIG. 8A. Assume inspection of the edges of the first hatched no-copper zone between points $R_{02}$ and $R_1$ has just been completed. Note that there is no need to inspect the dashed MD "don't care" zone area 90 around the lead tip. It follows that the algorithm can skip to point $R_2$ in order to begin inspecting the left-hand edge of the next no-copper zone. Note that the data words are not incremented in a like degree, since an essential data point $D_3$ would be lost in the event of a missing lead in the MD "don't care" zone, (i.e., data words $D_1$ and $D_2$ would not be present). However, on the next loop through the algorithm, only the data word is incremented to satisfy the condition $D_{i+1} \geq R_{j+1}$ - TD TOL. Note that in the event $D_{i+1} = D_{End}$ occurs before $R_{j+1} = R_{End}$, the inequality $D_{i+1} \geq R_{j+1}$ - TD TOL will always be satisfied, since $D_{End}$ is a very large value. In this case, the algorithm produces an Error signal to indicate that an invalid data word has been detected in an inspection zone.

TD tolerance value changes between inspection zones are easily accommodated by use of the decision block shown in the return path of the flow chart.

As an example, FIG. 8A shows that the TD tolerance about $R_{End}$ has been increased by 2 units over that which was used in the preceding inspection zone in accordance with the tabulated value.

Figure 8D:
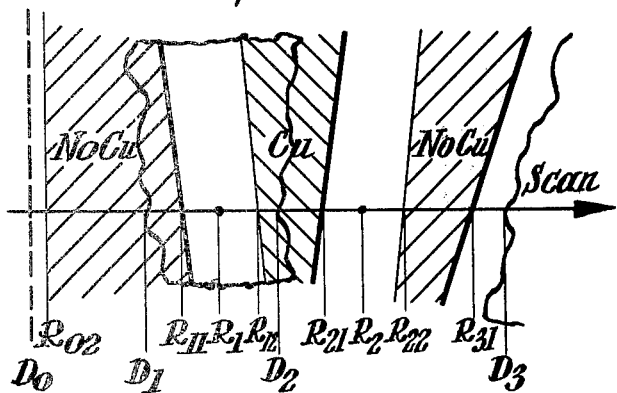
Figure 8E:
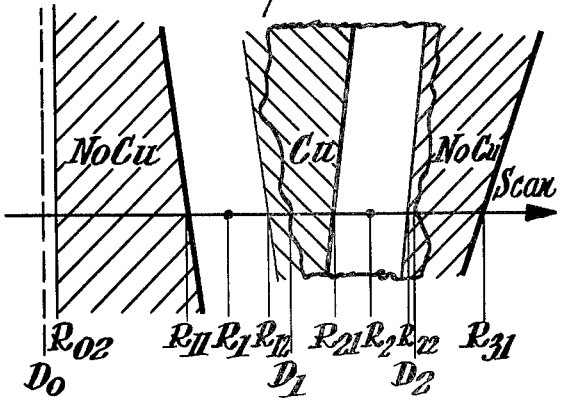

FIG. 8D shows a leftwardly displaced lead, which initiates an Error No. 10 signal. This defect condition can be described as a combination of Error No. 8, followed immediately by Error No. 9. Although not shown, the algorithm of FIGS. 7A and 7B can easily be modified to combine sequentially the Error signals which occur in adjacent inspection zones during any given scan in order to classify other classes of defects. For example, FIG. 8E shows a rightwardly displaced lead causing an Error No. 11 signal which can be identified by the combined occurrence of Error No. 9 twice in succession.

The end of the scan across the lead is signified by the end of scan reference bit $R_{End}$ being set in the reference word. The remaining data words are examined for proper values until the last data word, $D_{End}$, is identified by its most significant bit being set. These remaining data words are tested first to see if they represent a transition within the "dont't care" zone formed around $R_{End}$ and, if not, are tested to see if they occur before End Inspect. All "on-off" or "off-on" copper transitions which take place prior to or at the End Inspect point will cause an Error No. 14 to be registered. An example of such a defect is shown in FIG. 8A where a Cu blob forms a bridge between a no-Cu and a "don't care" zone. In this example, data word $D_6$ will be flagged as an Error No. 14, but data word $D_5$ will not, since it occurs in a "don't care" zone.

The last decision block (FIG. 7B) determines whether the edge transition which occurs beyond the End Inspection point marks the terminal edge of a copper bridge with its initial edge signal occurring in a "don't care" zone or whether it is a non-disqualifying defect. If the last data values are acceptable, a good scan has occurred and the algorithm returns for the next scan.

Although this invention treats the specific case of the inspection of film chip carrier patterns, the computer implementation of "don't care" zones around the edges of a pattern to be inspected on a scan-by-scan basis using an image sensor (e.g., line scan camera, image dissector, TV camera tube) provides a technique whereby numerous types of patterned products might be inspected for flaws, such as precision parts stamped from sheet metal or molded from plastics, printed paper or fabric rolls, or the inspection of photomasks and integrated circuits.

The following is a complete computer program word description for a Film Chip Carrier Inspector of the design hereinbefore described:

```
/PHOTO PRODUCTS FILM CHIP CARRIER PROGR    PAL8-V98    NO/DA/TE    PAGE 1

/PHOTO PRODUCTS FILM CHIP CARRIER PROGRAM

/PHOTO PRODUCTS FILM CHIP CARRIER PROGR    PAL8-V98    NO/DA/TE    PAGE 2

/DRIVER FOR DESCON TITLE PAGE
              /
              /%RA     E H SMITH JR
              /%RA     F TREIBER
              /%RA
              /%RA
              /%RA     ENGINEERING PHYSICS LABORATORY
              /%RA     WILMINGTON DELAWARE
              /%RA
              /%RA     CREATED 4/9/74
              /%RA
              /%RA     LAST REVISION: 7/8/74

/PHOTO PRODUCTS FILM CHIP CARRIER PROGR    PAL8-V98    NO/DA/TE    PAGE 3

/%RC FC102.PA  - THIS PROGRAM IS USED TO INSPECT FC102 CHIPS
              /
              /TO EXECUTE THE PROGRAM THE BINARY TAPE FOR FC102 AND THE
              /BINARY TAPE CONTAINING THE REFERENCE DESCRIPTORS AND THEIR
              /ASSOCIATED POINTER TABLE MUST BE LOADED.
              /
              /INSTRUCTIONS FOR OBTAINING THE REFERENCE DATA AND POINTER
              /TABLE ARE FOUND IN FCCRC.FT AND FCCDAF.FT
              /
              /
              /THE MQ REGISTER IS USED AS A FRONT PANEL DISPLAY ON
              /THE COMPUTER TO INDICATE STATUS AS FOLLOWS:
                       /
                       /LIGHT LEVEL      BITS 0-1
                       /SYNC IN PROGRESS BITS 2-3
                       /INITIALIZING     BITS 4-5
                       /REGISTRATION ERR BITS 6-7
                       /TOLERENCE ERROR  BITS 8-9
                       /DEFECT           BITS 10-11
              /
              /BIT 0 IS MSB AND BIT 11 IS LSB
              /
              /WHEN ACCUM IS DISPLAYED ONE BIT LIGHTED AND CIRCULATING
              /THROUGH THE DISPLAY INDICATES THE COMPUTER IS WAITING
              /FOR DATA FROM THE INTERFACE.

/BITS 10-11 LIGHT AS SOON AS A DEFECT HAPPENS.

/NOTE THAT THE REFERENCE VECTORS ARE LOCATED IN FIELD
              /ONE. THE PROGRAM REQUIRES AN 8K MINIMIUM TO RUN.
              /THE REFERENCE POINTER TABLE IS LOCATED IN FIELD ZERO.
```

/PHOTO PRODUCTS FILM CHIP CARRIER PROGR    PAL8-V98   NO/DA/TE    PAGE 4

```
                 /EXTENDED SYMBOLS FOR PAL8
     6140   FPUI=    5140
     6141   FPEI=    6141
     6142   FPCF=    6142
     6143   FPSF=    6143
     6144   FPRD=    6144
     6007   CAF=     6007
     6505   DBCO=    6505
     6506   DBSO=    6506
     6507   DBRO=    6507
     6102   SPL=     6102
     7421   MQL=     7421
     7501   MQA=     7501
     7701   ACL=     7701
     7521   CAM=     7621
     7521   SWP=     7521

FIXTAB
```

/PHOTO PRODUCTS FILM CHIP CARRIER PROGR    PAL8-V98   NO/DA/TE    PAGE 5

```
     0000    *0
00000  0002           0000     /INTERRUPT
00001  5777'          JMP SERVE           /INTERRUPT SERVICE ROUTINE

0004    *4
00004  7000           NOP      /ODT USES 4,5,6
00005  7000           NOP
00006  7000           NOP

/PNTSRT CONTAINS THE LOCATION IN MEMORY WHERE THE
        /POINTERS TO THE DESCRIPTORS ARE LOCATED. DURING INSPECTION
        /THE POINTER TABLE IS USED TO FIND THE START OF THE CURRENT
        /DESCRIPTOR AS WELL AS THE ONES BOTH BEFORE AND AHEAD OF
        /THE CURRENT SCAN.

OCTAL 00007  6000   PNTSRT, 6000     /STARTING LOCATION OF POINTERS TO REFERENCE
                               /POINTER TABLE IS IN FIELD 0 BUT POINTS
                               /TO VECTORS IN FIELD ONE.

/LOCATIONS 10 -17 ARE AUTO INDEX REGISTERS.

0010    *10
00010  0000           0000     /AUTO INDEX USED IN TTY PROGRAMS
00011  0000   VECT,   0000     /POINTER TO A VALUE IN A DESCRIPTOR
                               /VALUE IS LOCATED IN FIELD ONE
00012  0000   DATAPT, 0000     /POINTER TO INCOMING DATA

0020    *20

/THE FOLLOWING FOUR VALUES EFFECT THE ACCURACY OF INSPECTION.
        /ONLY TD ACCURACY CAN BE CHANGED BY MODIFYING THESE
        /CONSTANTS. TO CHANGE MD ACCURACY THE REFERENCE
        /MUST BE REGENERATED. SEE COMMENT PAGE 1 FOR DETAILS.

DECIMAL 00020  0012   RAMD,   0008     /REGISTRATION ACCURACY MD +/- MILLS
00021  0013   RATD,   0008     /REGISTRATION ACCURACY TD +/- MILLS/M
00022  0004   ACCTD,  0004     /FOIL ACCURACY TD +/- MILLS/M
00023  0004   ACCMD,  0004     /FOIL ACCURACY MD +/- MILLS
```

/ALL LOCATIONS BEGINING WITH SH ARE NUMBERS ASSOCIATED WITH
/PROCESSING OF THE SPROCKET HOLES.

/SHM01 IS THE DISTANCE IN MILLS FROM THE FIRST ENCOUNTER
/WITH THE COPPER PATTERN TO THE FIRST HOROZONTAL EDGE OF
/THE SPROCKET HOLE.

/SHMOY1 IS THE NEGATIVE OF THE MINIMIUM MD WIDTH OF THE SPROCKET
/HOLE THAT THE INSPECTOR SHOULD MEASURE.

/SHMOY2 IS THE NEGATIVE OF THE MAXIMUM WIDTH THAT SHOULD
/BE MEASURED.

/PHOTO PRODUCTS FILM CHIP CARRIER PROGR    PAL8-V98   NO/DA/TE   PAGE 6

```
                    /SHMDY IS THE NEGATIVE OF THE ACTUAL MD WIDTH OF A SPROCKET
                    /HOLE IN MILLS.

00024  0240   SHMD1,   160      /MD LOCATION OF SPROCKET HOLE
00025  7720   SHMDY1, -0048     /MINIMIUM MD WIDTH
00026  7706   SHMDY2, -0058     /MAXIMIMUM MD WIDTH
00027  7714   SHMDY,  -0052     /MD WIDTH OF SPROCKET IN MILLS

/SHTD IS THE DISTANCE IN MILLS/MAGNIFICATION FROM THE VERTICAL
                    /EDGE OF THE SPROCKET HOLE TO THE LEFT EDGE OF THE PATTERN.
                    /SHTDVE IS THE DIODE ADDRESS OF THE VERTICAL EDGE
                    /OF THE SPROCKET MEASURED AT THE CENTER OF THE SPROCKET IN MD
                    /IT IS DETERMINED EACH TIME THE SPROCKET IS SCANNED.

00030  0000   SHTDVE,  0000     /DIODE ADDRESS OF VERTICAL EDGE
00031  0000   SHTD,    0000     /TD LOCATION OF SPROCKET HOLE FROM PATTERN EDGE

/SHMDS1 GIVES THE MD VALUE REFERENCED FROM THE FIRST ENCOUNTER
                    /WITH THE COPPER IN THE MD THAT THE PROGRAM SHOULD START
                    /SEARCHING FOR THE SPROCKET HOLE.
                    /SHMDS1 LIKEWISE GIVE THE VALUE BEYOND THE SPROCKET WHERE
                    /SEARCHING MAY CEASE.
                    /SHTDS IS THE TD VALUE WHICH THE SPROCKET LIES TO THE LEFT OF.
                    /MD VALUES ARE REFERENCED FROM THE PREVIOUS SPROCKET HOLE 00032  0220   SHMDS1, 144       /VALUE AND NEXT TWO PUT A ZONE
00033  0260   SHMDS2, 176       /PUT AN INSPECTION ZONE ABOUT
00034  0050   SHTDS,  40        /HOLE

/ALL LOCATIONS BEGINING WITH PT ARE NUMBERS ASSOCIATED WITH
                    /THE PATTERN.
                    /PTMD1 AND PTMD2 PLACE AN INSPECTION ZONE IN THE MACHINE
                    /DIRECTION ABOUT THE PATTERN.
                    /PTTD GIVES THE DIODE ADDRESS ACROSS THE PATTERN AT WHICH
                    /PATTERN INSPECTION CAN BEGIN.

00035  0203   PTMD1,  131       /THIS VALUE AND NEXT TWO
00036  0130   PTMD2,  88        /PUT AN INSPECTION ZONE ABOUT
00037  0200   PTTD,   128       /THE PATTERN

/PTDI IS AN APPROXIMATE DIODE ADDRESS WHERE THE LEFT EDGE
                    /OF COPPER WILL BE ENCOUNTERED. THE ACTUAL VALUE WILL
                    /DEPEND UPON PRODUCT EDGE ALIGNMENT AND REGISTRATION
                    /ACCURACY.

00040  0000   PTDI,   0000      / LOCATION OF DIODE ADDRESS OF LEFT
                                /PATTERN EDGE AS DETERMINED BY SHTDVE & SHTD

/PTDO IS USED TO STORE THE ACTUAL LOCATION OF THE LEFT
                    /EDGE OF THE PATTERN AS DETERMINED BY THE INSPECTION
                    /ALGORTHM AT THE BEGINNING OF EACH PATTERN. SINCE ALL
                    /DESCRIPTORS ARE REFERENCED TO 0=LEFT EDGE, PTDO IS
                    /ADDED TO EACH DESCRIPTOR VALUE SO THAT PATTERN SCANS
                    /CAN BE COMPARED.
```

/PHOTO PRODUCTS FILM CHIP CARRIER PROGR    PAL8-V98   NO/DA/TE   PAGE 7

```
00041  0000   PTDO,   0000      /MEASURED EDGE OF PATTERN

/PTMAX IS THE MD LENTH OF THE PATTERN IN MILLS.
                    /THERE WILL THEREFOR BE PTMAX REFERENCE VECTORS.

00042  0154   PTMAX,  115       /MD LENTH OF PATTERN -1 (# OF SCANS COPPER
                                /IS TO BE EXPECTED -1)

/ALL LOCATIONS BEGINNING WITH R ARE USED IN REGISTRATION
                    /CALCULATIONS.
                    /RTD1-RTD4 ARE USED TO STORE THE TD VALUES
                    /OF FOUR PATTERN EDGES.
                    /RMD1-RMD4 ARE THE MD LOCATIONS REFERENCED TO THE BEGINNING
                    /OF THE PATTERN WHERE THESE MEASUREMENT ARE TO BE MADE.
```

```
00043   0310    RT01,   0200    /AS THE PROGRAM IS PRESENTLY SETUP TO REGIS
00044   0454    RT02,   0300    /IS DETERMINED JUST AFTER PATTERN SCANNING
00045   0000    RT03,   0030    /STARTS AT SUBROUTINE BREGIS. THE CENTER
00046   0000    RT04,   0000    /LEAD OF THE FC102 WILL BE USED ALONE TO
00047   0000    RM01,   0000    /DETERMINE THIS. RT01 AND RT2 MUST CONTAIN
00050   0000    RM02,   0000    /THE DIODE ADDRESS OF THE CENTER LEAD EDGES.
00051   0000    RM03,   0000    /RT01=LEFT EDGE AND RT02=THE RIGHT EDGE.
00052   0256    RM04,   0174

/RMDA-D, RMA-D AND RTDA-RTDD ARE USED TO DETERMINE THE
                /MD REGISTRATION ACCURACY. RMDA-D ARE USED FOR STORAGE
                /OF FOUR VALUES WHERE COPPER IS ENCOUNTERED IN THE
                /MD LOCATION. RMA-D GIVE THE DESCRIPTORS WHERE THE
                /MEASUREMENT SEARCH SHOULD START (MD) AND RTDA-D TELLS WHAT
                /DIODE ACROSS THE PATTERN THE COPPER SHOULD BE ENCOUNTERED.

00053   0000    RMDA,   0000    /THIS PART IS NOT WRITTEN INTO THE PROGRAM
00054   0000    RMDB,   0000    /YET
00055   0000    RMDC,   0000
00056   0000    RMDD,   0000
00057   0036    RMA,    0030
00060   0077    RMB,    0063
00061   0200    RMC,    0128
00062   0240    RMD,    0160
00063   0100    RTDA,   0064
00064   0100    RTDB,   0064
00065   0100    RTDC,   0064
00066   0100    RTDD,   0064

/THE FOLLOWING TWO LOCATIONS ARE USED TO STORE THE
                /REGISTRATION ERRORS THAT ARE DETERMINED AT THE CONCLUSION
                /OF INSPECTING EACH DEVICE. AS THE PROGRAM IS WRITTEN
                /PRESEONTLY THEY ARE NOT USED.

00067   0000    RMERR,  0000    /MD REG ERROR
00070   0000    RTDERR, 0000    /TD REG ERROR

OCTAL

/PHOTO PRODUCTS FILM CHIP CARRIER PROGR    PAL8-V9B   NO/DA/TE   PAGE 7-1

/MDCNT KEEPS TRACK OF MD REFERENCED TO THE BEGINING OF

/PHOTO PRODUCTS FILM CHIP CARRIER PROGR    PAL8-V9B   NO/DA/TE   PAGE 8

/THE PATTERN BEING INSPECTED. MDCNT IS SET TO ZERO WHEN
                /COPPER IS FIRST ENCOUNTERED.

/SHMCNT IS AN MD COUNTER SET EACH TIME THE FIRST EDGE OF
                /A SPROCKET HOLE IS ENCOUNTERED TO THE VALUE IN MILLS
                /FROM THE FIRST EDGE OF A PERFECT PATTERN TO THE HOLE.
                /FOR PERFECT REGISTRATION AND PRODUCT MDCNT=SPMCNT.

00071   0000    MDCNT,  0000
00072   0000    SHMCNT, 0000

00073   0000    VECPNT, 0000    /STARTING LOCATION OF CURRENT POINTER
00074   0000    STATUS, 0000    /STATUS OF LAST DEVICE
00075   0000    QUALTY, 0000    /STATUS OF PRESENT DEVICE
00076   0127    DATAST, 0127    /STARTING LOC OF DATA -1

00077   0000    G1,     0000    /G REGISTERS ARE GENERAL PURPOSE
00100   0000    G2,     0000    /USED FOR SHORT TERM STORAGE
00101   0000    G3,     0000

/REGISTERS STARTING WITH M ARE USED IN STORAGE OF THE
                /CARRIER GO/NO GO DECISIONS UNTIL THE PARTICULAR PART IS
                /UNDER THE PUNCH.

00102   0000    MEM1,   0000    /MEM1-MEM5 COMPRISE A SHIFT REGISTER
00103   0000    MEM2,   0000    /THAT CAN DELAY PUNCHING UP TO 60
00104   0000    MEM3,   0000    /DEVICES BETWEEN THE INSPECTOR AND PUNCH.
00105   0000    MEM4,   0000
00106   0000    MEM5,   0000
```

```
00107  0100   MGROSS, 0100    /IDENTIFIES WHICH OF THE 5 SHIFT REGISTER
                              /WORDS THAT THE OUTPUT BIT SHOULD BE TAKEN
00110  0010   MBIT,   0010    /DEFINES WHICH BIT IN MGROSS THE OUTPUT
                              /SHOULD BE TAKEN FROM. IS A MASK.

/FOLLOWING ARE USED IN VERIFY SUBROUTINE
00111  0000   VFLAG,  0000    /FLAG TO TELL WHEN END OF SCAN REACHED
00112  0000   VRL,    0000    /STORAGE FOR LOWER REF VALUE
00113  0000   VRU,    0000    /STORAGE FOR UPPER REF VALUE
00114  0000   VDL,    0000    /STORAGE FOR LOWER DATA VALUE
00115  0000   VDU,    0000    /STORAGE FOR UPPER DATA VALUE
00116  0000   V1,     0000
00117  0000   V2,     0000
00120  0000   V3,     0000
00121  0000   VTOLTD, 0000    /TO TOLERENCE TO BE USED IN VERIFY
00122  0000   VCOP,   0000    /IS =1 IF SHOULD BE CU, OTHERWISE=0

/FLAG FOR ERROR PRINTOUT: =1 IF PRINTOUT DESIRED 00123  0000   ERRPRT, 0

0130   *130
00130  0000   DATA,   0000    /LOCATIONS 140-177 ARE
```

/PHOTO PRODUCTS FILM CHIP CARRIER PROGR    PAL8-V9B    NO/DA/TE    PAGE 8-1

```
                              /RESERVED FOR 1 SCAN OF 32 WORDS
       0200           PAGE
```

/PHOTO PRODUCTS FILM CHIP CARRIER PROGR    PAL8-V9B    NO/DA/TE    PAGE 9

```
       0200   *200
00200  6002           IOF             /PROGRAM START, INTERRUPT OFF
00201  4777'          JMS TTME        /PRINT TITLE
00202  4543           TEXT /%## FILM CHIP CARRIER INSPECTION%#/
00203  4340
00204  0611
00205  1415
00206  4003
00207  1011
00210  2040
00211  0301
00212  2222
00213  1105
00214  2240
00215  1116
00216  2320
00217  0503
00220  2411
00221  1716
00222  4543
00223  0000
00224  7300          CLA CLL
00225  3123          DCA ERRPRT       /CLEAR ERROR PRINT FLAG
00226  4777'         JMS TTME
00227  2022          TEXT /PRT ERR ?/
00230  2440
00231  0522
00232  2240
00233  7700
00234  4776'         JMS TTYN         /YES =PRINT ERRORS
00235  7450          SNA
00236  5240          JMP .+2
00237  3123          DCA ERRPRT       /YES 00240  6002  RESTRT, IOF     /INTERRUPT OFF, RESTART POINT
                             /WHEN A PROGRAM ERROR IS DETECTED
00241  4247          JMS SYNC         /SYNC TO SPROCKET HOLE 00242  4775' INSPCT, JMS INITAL       /INITIALIZE PRIOR TO INSPECTING
                                      /A FRAME
00243  4774'         JMS BEGIN        /BEGIN INSPECTION AND DETERMINE ALIGNMENT
00244  4773'         JMS PATRN        /INSPECT THE PATTERN
00245  4772'         JMS END /INSPECT LAST FEW LINES & DETERMINE
                                      /REGISTRATION ERROR.
00246  5242          JMP INSPCT       /GO BACK FOR ANOTHER
```

/PHOTO PRODUCTS FILM CHIP CARRIER PROGR   PAL8-V9B  NO/DA/TE   PAGE 10

```
                /XR SUBROUTINE SYNC
                /XTW FINDS SPROCKET HOLE
                /VERIFIES DETECTION BY CHECKING FOR PROPER MQ WIDTH
                /RESETS MQ COUNTERS
                /LIGHTS MQ DISPLAY WITH 0637 TO SHOW SYNC IN PROGRESS
                /SETS DR8 OUTPUT TO REJECT ALL DEVICES
                /DETERMINES DIODE ADDRESS OF VERTICAL EDGE OF
                /SPROCKET (SHTDVE)
                /CHECKS LIGHT LEVEL AND SETS 2 MSBS OF MQ DISPLAY
                /IF LEVEL IS ADEQUATE
                /DROPS MQ SYNC LIGHTS IF SYNC ACCOMPLISHED 00247  0000   SYNC,   0000    /SPROCKET HOLE SYNC SUBROUTINE
00250  7300           CLA CLL /FIRST LIGHT MQ TO SHOW
00251  1371           TAD (1477)    /SYNC IN PROGRESS
00252  7421           MQL     /SWAP AND CLEAR ACCUMULATOR
00253  7001           IAC     /PUT 1 IN ACCUM
00254  6506           DBSO    /SET DR8 TO REJECT
00255  7340           CLA CLL CMA   /SET ACCUM TO 7777
00256  3102           DCA MEM1
00257  7340           CLA CLL CMA
00260  3103           DCA MEM2
00261  7340           CLA CLL CMA
00262  3104           DCA MEM3
00263  7340           CLA CLL CMA
00264  3105           DCA MEM4
00265  7340           CLA CLL CMA
00266  3106           DCA MEM5
00267  1370           TAD (0077)
00270  3075           DCA QUALTY
00271  7300   SLOOK,  CLA CLL /CLEAR REGISTER THAT MEASURES SPROCKET WIDTH
00272  1367           TAD (-1)
00273  3356           DCA S2
00274  4766'  SAGAIN, JMS WAIT      /WAIT FOR A SCAN
00275  1412           TAD I DATAPT  /GET FIRST VALUE
00276  3355           DCA S1   /STORE IT TEMPOR
00277  1355           TAD S1
00300  0365           AND (5777)    /STRIP OFF LIGHT LEVEL BIT
00301  1364           TAD (7000)    /ADD NEGATIVE OF VALUE EXPECTED
                                    /FOR SPROCKET HOLE DETECTION(-512)
                                    /COPPER BIT SET, OTHERS ZERO
00302  7640           SZA CLA /CONTINUE ONLY IF DIFFERENCE IS ZERO
00303  5271           JMP SLOOK     /RETURN, NOT A SPROCKET
00304  2356           ISZ S2  /INCREMENT SPROCKET MQ WIDTH CNTER
00305  7300           CLA CLL /NOW SEE OF IN MIDDLE OF SPROCKET IN MQ
00306  7020           CML     /COMPLIMENT LINK-SET TO 1
00307  1027           TAD SHMDY     /FIRST MUST FIND OUT WHAT MIDDLE
00310  7010           RAR     /VALUE IS BY DIVIDING MQ WIDTH BY 2
00311  1356           TAD S2
00312  7640           SZA CLA /SKIP IF SITTING 1/2 WAY THROUGH
00313  5316           JMP .+3 /NOT 1/2 WAY THROUGH EXACTLY
00314  4763'          JMS LGTLEV    /1/2 WAY - DETERMINE LIGHT LEVEL OK
00315  4762'          JMS SPKTD     /DETERMINE SHTDVE
00316  7300           CLA CLL
00317  1356           TAD S2  /NOW FIND OUT IF HAVE ENOUGH SCANS TO BE
```

/PHOTO PRODUCTS FILM CHIP CARRIER PROGR   PAL8-V9B  NO/DA/TE   PAGE 10-1

```
00320  1025           TAD SHMDY1    /NEAR END OF SPROCKET IN MQ
```

/PHOTO PRODUCTS FILM CHIP CARRIER PROGR   PAL8-V9B  NO/DA/TE   PAGE 11

```
00321  7440           SZA     /AM THERE IF ZERO
00322  5274           JMP SAGAIN    /NO, MUST CONTINUE LOOKING AT SCANS
00323  4756'  SLAST,  JMS WAIT      /WAIT UNTIL MQ HAS INCREMENTED
00324  2356           ISZ S2  /INCREMENT SPROCKET COUNTER
00325  7300           CLA CLL /BEYOND MAX WIDTH EXPECTED?
00326  1356           TAD S2
00327  1026           TAD SHMDY2
00330  7510           SPA     />0 MQ LARGER THAN SHMDY2
00331  5323           JMP SLAST     /NOT YET, WAIT SOME MORE
```

```
00332  7300           CLA CLL  /YES HAVE GONE BEYOND SPROCKET
00333  1412           TAD I DATAPT    /IF IT WAS SPROCKET DETECTED
00334  0361           AND (4777)      /THE PRESENT SCAN SHOULD BE ZERO
00335  7532           SPA SZL  /IF FIRST BIT IS SET ARE BEYOND SPROCKET
00336  5343           JMP .+5  /YES,DEFINATELY BEYOND
00337  7041           CMA IAC
00340  1034           TAD SHTDS       /NOT SURE, VALUE MUST BE > SHTDS
00341  7540           SMA SZA
00342  5271           JMP SLOOK       /NO GOOD, TRY SYNCING AGAIN
00343  7300           CLA CLL
00344  1356           TAD S2   /YES EVERY THING CHECKS, IN SYNC
00345  1024           TAD SHM01
00346  3071           DCA MDCNT       /SET UP COUNTERS
00347  1071           TAD MDCNT
00350  3072           DCA SHMCNT
00351  7701           ACL      /LOAD MQ INTO ACCUM
00352  0350           AND (6377)      /DROP SYNC BITS
00353  7421           MQL
00354  5647           JMP I SYNC      /DONE,RETURN TO MAIN PROGRAM 00355  0000    S1,    0000     /TEMPORARY STORAGE
00356  0000    S2,    0000     /SPROCKET MD WIDTH COUNTER 00360  6377
00361  4777
00362  0400
00363  3000
00364  7200
00365  5777
00366  2600
00367  7777
00370  0077
00371  1477
00372  1400
00373  1247
00374  0711
00375  0500
00376  4053
00377  3467
       0400           PAGE
```

/PHOTO PRODUCTS FILM CHIP CARRIER PROGR    PAL8-V9B   NO/OA/TE   PAGE 12

```
        /%R SUBROUTINE SPKTO
        /%TH DETERMINES THE DIODE ADDRESS OF THE VERTICAL EDGE
        /OF THE SPROKET.
        /HOLE. SHOULD BE ENTERED ONLY WHEN SCANNER IS PRESENTLY
        /KNOWN TO BE SCANNING THE MD CENTER OF THE SPROCKET.
        /IF VALUE FOUND IS OUTSIDE OF SPROCKET INSPECTION
        /ZONE, THE PROGRAM DEFAULTS BACK TO RESTRT AND
        /SYSTEM IS FORCED TO RESYNC.

00400  0000    SPKTO, 0000     /DETERMINE SHTDVE
00401  7201           CLA IAC  /SET ACCUM TO 1
00402  1075           TAD DATAST      /SET UP DATA POINTER
00403  3012           DCA DATAPT      /POINTS NOW TO SECOND DATA VALUE
00404  1412           TAD I DATAPT    /1ST VALUE ALREADY CONFIRMED TO BE
00405  0377           AND (1777)      /FIRST DIODE ADDRESS. NOW STRIP OFF
00406  3217           DCA SP1  /2 MSBS AND PUT IN TEMPORARY STORAGE.
00407  1217           TAD SP1
00410  7041           CIA      /SET ACCUM TO NEGATIVE
00411  1034           TAD SHTDS       /VERIFY VALUE IS INSIDE SPROCKET ZONE
00412  7710           SPA CLA  /SKIP IF WITHIN ZONE
00413  5220           JMP ERR13       /SOMETHING WRONG - RESYNC
00414  1217           TAD SP1  /OK - UPDATE VALUE
00415  3030           DCA SHTDVE
00416  5600           JMP I SPKTO     /RETURN TO MAIN PROGRAM 00417  0000    SP1,   0000     /TEMPORARY STORAGE 00420  1123    ERR13, TAD ERRPRT
00421  7650           SNA CLA         /PRINT?
00422  5776!          JMP RESTRT      /NO
00423  4775!          JMS TTME        /YES
00424  4543           TEXT /%*13 SH */
```

```
00425   0163
00426   4023
00427   1040
00430   7300
00431   7300            CLA CLL
00432   1072            TAD SHMCNT
00433   4774'           JMS TTOP        /PRINT SCAN #
00434   5776'           JMP RESTRT 00574   4007
00575   3467
00576   0240
00577   1777
        0600'           PAGE
```

/PHOTO PRODUCTS FILM CHIP CARRIER PROGR    PAL8-V9B   NO/DA/TE   PAGE 13

```
                /%RSUBROUTINE INITAL
                /%TW SET UP DIODE VALUE WHERE PATTERN IS FIRST EXPECTED
                /TO BE ENCOUNTERED IN THE TD
                /LIGHT THE INIT LIGHTS ON THE MQ DISPLAY
                /SET MD COUNTER = SPROCKET COUNTER
                /SET UP POINTER TO FIRST REFERENCE VECTOR
                /TRANSFER RESULTS OF LAST PATTERN INSPECTION TO
                /MQ DISPLAY, ENTER RESULTS IN DEFECT MEMORY,
                /AND DETERMINE OUTPUT STATUS FROM MEMORY TO DR8.
                /WAIT UNTIL WITHIN MD INSPECTION ZONE
                /RESET SPROCKET FOUND AND OK FLAGS 00600   0000    INITAL, 0000    /INITIALIZE BEFORE INSPECTING PATTERN
00601   4777'           JMS WAIT        /STAY IN SYNC WITH SCANNER
00602   7300            CLA CLL
00603   1376            TAD (300)
00604   7501            MQA             /SETS THE INIT BITS FOR DISPLAY IN MQ
00605   7421            MQL             /LOAD THE RESULTS AND CLEAR ACCUM
00606   1030            TAD SHTDVE      /SET UP LEFT HAND EDGE OF COPPER
00607   1031            TAD SHTD        /BY ADDING SPROCKET EDGE DIODE ADDRESS
00610   3040            DCA PTDI        /TO # OF DIODES FROM EDGE TO COPPER
00611   1040            TAD PTDI
00612   3041            DCA PTDO        /PUT IN IN ACTIVE REGISTER
00613   1072            TAD SHMCNT
00614   3071            DCA MDCNT       /SET MDCNT=SHMCNT
00615   1007            TAD PNTSRT
00616   3073            DCA VECPNT      /SET UP REFERENCE POINTER
00617   7521            SWP             /SWAP ACCUM AND MQ
00620   0375            AND (7700)      /STRIP OFF PREVIOUS QUAL BITS
00621   7521            SWP             /PUT RESULTS BACK IN MQ
00622   1075            TAD QUALTY      /NOW UPDATE MQ DISPLAY
00623   0374            AND (0074       /STRIP OFF DEFECT LITES
00624   7501            MQA
00625   7421            MQL
00626   7300            CLA CLL /UPDATE MEMORY
00627   1106            TAD MEM5        /MOVE BITS IN MEMORY LEFT ONE
00630   7004            RAL
00631   3106            DCA MEM5
00632   7300            CLA CLL
00633   1105            TAD MEM4
00634   7004            RAL
00635   3105            DCA MEM4
00636   7204            GLK             /GET LINK AND PUT IN ACCUM LSB
00637   1106            TAD MEM5
00640   3106            DCA MEM5
00641   7300            CLA CLL
00642   1104            TAD MEM3
00643   7004            RAL
00644   3104            DCA MEM3
00645   7204            GLK
00646   1105            TAD MEM4
00647   3105            DCA MEM4
00650   7300            CLA CLL
00651   1103            TAD MEM2
00652   7004            RAL
```

/PHOTO PRODUCTS FILM CHIP CARRIER PROGR    PAL8-V9B   NO/DA/TE   PAGE 13-1

```
00653   3103            DCA MEM2
00654   7204            GLK
```

/PHOTO PRODUCTS FILM CHIP CARRIER PROGR    PAL8-V9B  NO/DA/TE  PAGE 14

```
00655  1104            TAD MEM3
00656  3104            DCA MEM3
00657  7300            CLA CLL
00660  1102            TAD MEM1
00661  7004            RAL
00662  3102            DCA MEM1
00663  7204            GLK
00664  1103            TAD MEM2
00665  3103            DCA MEM2
00666  1075            TAD QUALTY
00667  0373            AND (0001)
00670  1102            TAD MEM1
00671  3102            DCA MEM1        /THIS COMPLETES MOVING MEMORY BITS
00672  3772'           DCA PSFND       /RESET SPROCKET FOUND FLAG
00673  3771'           DCA PFLAG       /RESET SPROCKET OK FLAG
00674  3075            DCA QUALTY      /CLEAR QUAL REG
00675  1507            TAD I MGROSS    /NOW SET DR8
00676  0110            AND M8IT
00677  7640            SZA CLA /SKIP IF CARRIER WAS GOOD
00700  1373            TAD (0001)
00701  6506            DBSO    /PUT APPROPRIATE VALUE IN DR8
00702  4777'  IWAIT,   JMS WAIT        /WAIT FOR ANOTHER SCAN
00703  1035            TAD PTM01       /NOW WAIT FOR MD INSP ZONE
00704  7041            CIA             /SET ACCUM TO NEG
00705  1071            TAD MDCNT
00706  7640            SZA CLA /SKIP WHEN ZONE REACHED
00707  5302            JMP IWAIT       /NOT THERE YET
00710  5600            JMP I INITAL    /DONE, READY TO LOOK FOR COPPER
```

/PHOTO PRODUCTS FILM CHIP CARRIER PROGR    PAL8-V9B  NO/DA/TE  PAGE 15

```
            /%R SUBROUTINE BEGIN - LOOKS FOR BEGINING OF PATTERN BY
            /%TW SEARCHING FOR NO COPPER IN THE PATTERN AREA
            /FOLLOWED BY COPPER IN PROPER AREA.  VERIFIES INITIAL
            /DETECTION OF COPPER IS CORRECT BY COMPARING WITH REFER-
            /ENCE VECTOR INCLUDING REGISTRATION AND ACCURACY
            /TOLERENCES.
            /AS SOON AS COPPER IS DETECTED THE INITIAL BITS IN
            /THE MQ ARE EXTINGUISHED.
            /THE ROUTINE PROCESSES SCANS FOR 2 X (RAMD+ACCMD)
            /SCANS. IT THEN DETERMINES TD REGISTRATION BASED
            /UPON THE POSITION OF ONE LEAD DEFINED BY RTDLA
            /AND RTDLB.
            /FAILURE OF ANY OF THE TEST CAUSES A DEFECT CONDITION
            /TO BE ENTERED IN QUALTY AND PROGRAM EXIT TO "DEFECT".
            /SEQUENCE IS AS FOLLOWS:
            /1.VERIFY NO COPPER WITHIN INSPECTION ZONE UNTIL
            /THE MD COUNTER IS WITHIN RAMD + ACCMD OF EXPECTED
            /IF TEST FAILS PART IS DEFECTIVE.
            /2. LOOK FOR COPPER IN ZONE 300 - RAMD - ACCMD
            / < MDCNT < 300 + RAMD +ACCMD.
            /WHEN MDCNT = 300 RESET SHMCNT = 0. WHEN
            /THE COPPER IS DETECTED VERIFY IT IS WITHIN THE LEAD
            /STRUCTURE DEFINED BY THE FIRST REFERENCE VECTOR
            /+ OR - (RATD + ACCTD).
            /3. AT THIS POINT RESET THE MQ INITIAL BITS
            /4. SET MDCNT =0
            /5. INSPECT FOR 2X(RAMD+ACCMD) SCANS USING A
            /LOOSE TD TOLERENCE = +/- (RATD+ACCTD).
            /AFTERWARDS, DETERMINE TD REGISTRATION BY
            /EXAMINING ONE LEAD AND COMPARING IT'S
            /LOCATION TO RTDLA AND RTDLB.
            /6.GO BACK TO MAIN PROGRAM.

00711  0000   BEGIN,   0000    /START INSPECTING A PATTERN

/%R BWAIT IS THE ROUTINE THAT LOOKS FOR COPPER FREE SCANS 00712  4777'  BWAIT,   JMS WAIT        /WAIT FOR A SCAN
00713  7300            CLA CLL /SCAN DETECTED
00714  1320            TAD RAMD        /MD REG ERROR ALLOWED
00715  1023            TAD ACCMD       /MD ACCURACY ERROR ALLOWED
00716  1072            TAD SHMCNT
00717  1370            TAD (-454)      /-300 DECIMAL
```

```
00720  7700         SMA CLA  /SKIP IF< 0;STILL IN COPPER FREE
00721  5767'        JMP BLOOK+1  /LOOK FOR COPPER
00722  4766'        JMS ZEROLK   /CHECK SCAN FOR COPPER FREE
00723  7700         SMA CLA  /SKIP IF COPPER IS PRESENT
00724  5312         JMP BWAIT    /COPPER FREE, GO BACK FOR MORE
00725  1365         TAD (0077)   /HARD TO SAY PROBLEM, PART IS DEFECTIVE
00726  3075         DCA QUALTY
00727  5330         JMP ERR02

00730  1123  ERR02, TAD ERRPRT
00731  7650         SNA CLA  /PRINT?
00732  4764'        JMS DEFECT  /NO
```

/PHOTO PRODUCTS FILM CHIP CARRIER PROGR    PAL8-V9B   NO/DA/TE   PAGE 15-1

```
00733  4763'        JMS TTME   /YES
00734  4543         TEXT /%*02 SH */
00735  0062
00736  4023
00737  1040
00740  7500
00741  7300         CLA CLL
00742  1072         TAD SHMCNT
00743  4762'        JMS TTDP   /PRINT SH COUNTER
00744  4761'        JMS RESTRT 00761  0240
00762  4007
00763  3467
00764  3035
00765  0077
00766  1000
00767  1625
00770  7324
00771  1677
00772  1676
00773  0001
00774  0074
00775  7700
00776  0300
00777  2603
       1000'        PAGE
```

/PHOTO PRODUCTS FILM CHIP CARRIER PROGR    PAL8-V9B   NO/DA/TE   PAGE 16

```
       /XR SUBROUTINE ZEROLK - LOOKS AT PATTERN SCANS
       /XTN WHERE NO COPPER IS EXPECTED AND RETURNS WITH ACCUM +
       /IF NO COPPER FOUND BEYOND DIODE ADDRESS DEFINED BY PTTD

/ENTER WITH DATA POINTER SET TO BEGINNING.

01000  0000  ZEROLK, 0000   /SUBROUTINE TO LOOK FOR COPPER FREE SCAN
01001  7300         CLA CLL  /IN ZERO ZONE; VERIFY IT IS CU FREE
01002  1412         TAD I DATAPT   /DETERMINE LAST DATA VALUE
01003  7700         SMA CLA  /SKIP WHEN LAST VALUE IS FOUND
01004  5202         JMP .-2  /GO BACK FOR ANOTHER
01005  1012         TAD DATAPT
01006  1377         TAD (-1
01007  7041         CIA       /- POINTER TO DATA
01010  1076         TAD DATAST
01011  7640         SZA CLA   /IS IT THE FIRST DATA WORD?
01012  5215         JMP .+3   /NO
01013  7001         IAC       /YES SET AC =1

01014  5224         JMP ZEREXT  /EXIT WITH AC +
01015  1376         TAD (-2)
01016  1012         TAD DATAPT.   /GET PREVIOUS DATA VALUE
01017  3012         DCA DATAPT
01020  1412         TAD I DATAPT
01021  0375         AND (0777)    /STRIP OFF UNWANTED BITS
01022  7041         CIA           /NEGATE IT
01023  1037         TAD PTTD      /LEFT SIDE OF ZONE
01024  5600  ZEREXT, JMP I ZEROLK   /RETURN WITH ACCUM + IF
                                    /NO COPPER PRESENT
```

```
/PHOTO PRODUCTS FILM CHIP CARRIER PROGR    PAL8-V9B   NO/OA/TE   PAGE 17

/%RSUBROUTINE BLOOK
           /%TW LOOKS FOR COPPER AT BEGINNING OF PATTERN
           / IN ZONE DIFINED BETWEEN MO OF +/-(RAMO+ACCMO)

01025  4774' BLOOK,  JMS WAIT          /WAIT FOR A SCAN
01026  7300         CLA CLL  /SCAN HAS OCCORED
01027  1373         TAD (-454)         /DETERMINE IF COUNTER =300
01030  1072         TAD SHMCNT
01031  7650         SNA CLA  /SKIP IF NOT 300
01032  3072         DCA SHMCNT         /YES-RESET TO 0
01033  7201         CLA IAC  /NOW FIND OUT IF BEYOND ZONE WHERE
01034  1020         TAD RAMO           /COPPER SHOULD BE SEEN
01035  1023         TAD ACCMO
01036  7041         CIA      /NEGATE
01037  1072         TAD SHMCNT
01040  7650         SNA CLA  /SKIP IF NOT BEYOND
01041  5256         JMP ERR03          /COPPER NOT FOUND
01042  4200         JMS ZEROLK         /IS SCAN COPPER FREE?
01043  7700         SMA CLA  /SKIP IF COPPER PRESENT
01044  5225         JMP BLOOK          /NO COPPER, GO BACK FOR ANOTHER
01045  7200         CLA      /COPPER FOUND, SET MDCNT=0
01046  3071         DCA MDCNT
01047  7521         SWP      /SWAP ACCUM AND MQ REG
01050  0372         AND (7477)         /TURN OFF INITIALIZE LIGHTS
01051  7521         SWP      /RESET MQ
01052  7300         CLA CLL  /NOW SETUP TO CHECK FOR COPPER WITHIN
01053  1076         TAD DATAST         /PROPER BOUNDS
01054  3012         DCA DATAPT         /RESET DATA POINTER
01055  5274         JMP BCOPER+1       /PROCESS COPPER 01056  1123  ERR03, TAD ERRPRT
01057  7650         SNA CLA            /PRINT ERROR?
01060  4771'        JMS DEFECT         /NO
01061  4770'        JMS TTME           /YES
01062  4543         TEXT /%03 SH =/
01063  6063
01064  4023
01065  1340
01066  7500
01067  7300         CLA CLL
01070  1072         TAD SHMCNT
01071  4767'        JMS TTDP           /PRINT SH COUNTER
01072  4756'        JMS RESTRT

/PHOTO PRODUCTS FILM CHIP CARRIER PROGR    PAL8-V9B   NO/OA/TE   PAGE 18

/%9 SUBROUTINE BCOPER
           /%TW PROCESSES FIRST 2 X (RAMO +ACCMO) +
           /SCANS OF PATTERN AND CHECKS FOR COPPER IN RIGHT LOCATIONS.

01073  1072  BCOPER, TAD SHMCNT
01074  1373         TAD (-454
01075  7650         SNA CLA            /IS SHMDCNT =300?
01076  3072         DCA SHMCNT         /YES RESET TO 0
01077  7000         NOP
01100  7340         CLA CLL CMA        /SET ACCUM TO -1 AND SET UP
01101  1473         TAD I VECPNT       /AUTO INDEX REF POINTER
01102  3011         DCA VECT
01103  1021         TAD RATO           /NOW SET UP ACCURACY VALUE TO
01104  1022         TAD ACCTO          /BE USED IN VERIFY SUBROUTINE
01105  3121         DCA VTOLTO         /REGISTER IN VERIFY SUBROUTINE
01106  4765'        JMS VERIFY         /VERIFY EXAMINES A LINE AND RETURNS
                                       /ONLY IF SCAN WAS OK
01107  2073         ISZ VECPNT         /INCREMENT VECPNT
01110  1020         TAD RAMO           /OK, HAVE REACHED LAST SCAN IN ZONE?
01111  1023         TAD ACCMO
01112  7004         RAL      /2 X (RAMO+ACCMO)
01113  7041         CIA      /NEGATE
01114  1071         TAD MDCNT
01115  7001         IAC      /MUST GET 1 SCAN BEYOND ZONE
01116  7640         SZA CLA  /IF ZERO READY TO DETERMINE REGISTRATION
01117  5321         JMP .+2  /NO GO BACK FOR ANOTHER SCAN
```

```
01120   5764'         JMP BREGIS       /YES, DETERMINE INITIAL REGIST
01121   4774'         JMS WAIT
01122   5273          JMP BCUPER 01164   1200
01165   2000
01166   0240
01167   4007
01170   3457
01171   3035
01172   7477
01173   7324
01174   2600
01175   0777
01176   7776
01177   7777
        1200          PAGE
```

/PHOTO PRODUCTS FILM CHIP CARRIER PROGR   PAL8-V9B   NO/DA/TE   PAGE 19

```
                /%R SUBROUTINE BREGIS
                /%TW DETERMINES THE TO REGISTRATION FOR THE
                / FC102 CHIP AND UPDATES PTDO ACCORDINGLY. A
                /DIFFERENT PATTERN MAY REQUIRE A DIFFERENT BREGIS
                /ROUTINE. THIS ROUTINE CAN ONLY BE ENTERED IF
                /THE SCAN HAS FIRST BEEN INSPECTED AND PASSED THE
                /TEST USING A RELAXED TO ERROR OF +/-(RATD+ACCTD).
                /THEREFOR IT IS KNOWN THAT THE DATA CONTAINS
                /A CONTIGUOUS CENTER LEAD OF APPROXIMATELY THE
                /RIGHT DIMENSIONS.

01200   7300  BREGIS, CLA CLL
01201   1076          TAD DATAST       /SET UP DATA POINTER
01202   3012          DCA DATAPT
01203   3245          DCA B3   /ZERO STORAGE REGISTERS
01204   3246          DCA B4
01205   1030          TAD SHTOVE
01206   1043          TAD RTD1         /GET LEFT EDGE OF CENTER LEAD
01207   1121          TAD VTOLTD       /ADD ERROR ALLOWED
01210   7041          CIA      /NEGATE AND STORE -SUM
01211   3243          DCA B1
01212   1044          TAD RTD2         /GET RIGHT EDGE OF CENTER LEAD
01213   1030          TAD SHTOVE
01214   7041          CIA      /NEGATE IT
01215   1121          TAD VTOLTD       /REDUCE NEG VALUE BY ALLOWED ERROR
01216   3244          DCA B2   /STORE IT
01217   1246  BAGAIN, TAD B4   /PUT B4 IN B3
01220   3245          DCA B3
01221   1412          TAD I DATAPT     /GET DATA VALUE
01222   0377          AND (0777)       /STRIP OFF DATA VALUE
01223   3246          DCA B4   /STORE IT
01224   1246          TAD B4
01225   1244          TAD B2   /ADD TO IT REF VALUE
01226   7710          SPA CLA  /SKIP IF BEYOND REF VALUE
01227   5217          JMP BAGAIN       /NOT THERE YET, TRY AGAIN
01230   7300          CLA CLL  /MADE IT, NOW HAVE LEFT & RIGHT VALUES
01231   1245          TAD B3   /LEFT DATA
01232   1243          TAD B1   /-LEFT REF
01233   1246          TAD B4   /RIGHT DATA
01234   1244          TAD B2   /-RIGHT REF
01235   7010          RAR      /DIVIDE BY TWO TO GET AVERAGE ERROR
01236   1040          TAD PTDI         /ADD ERROR TO PTDI
01237   3041          DCA PTDO         /NOW PTDO TAKES INTO CONSIDERATION
                                       /TO REGISTRATION ERROR
01240   1776'         TAD BEGIN        /SET UP RETURN TO MAIN PROGRAM
01241   3243          DCA B1
01242   5643          JMP I B1         /GO BACK TO MAIN PROGRAM 01243   0000  B1,     0000     /REF STORAGE-LEFT EDGE
01244   0000  B2,     0000     /REF STORAGE-RIGHT EDGE
01245   0000  B3,     0000     /DATA STORAGE-LEFT EDGE
01246   0000  B4,     0000     /DATA STORAGE-RIGHT EDGE

/%R SUBROUTINE PATRN - PROCESSES ALL OF PATTERN SCANS EXCEPT
                   /%TW THOSE AT THE BEGINNING OF THE PATTERN. LOOKS
```

/PHOTO PRODUCTS FILM CHIP CARRIER PROGR    PAL8-V9B   NO/DA/TE   PAGE 19-1

```
                    /FOR AN MD COUNT INDICATING THAT IT IS WITHIN
                    /THE SPROCKET ZONE AND WHEN WITHIN THE ZONE
                    /DETERMINES SPROCKET LOCATION AND UPDATES
                    /PTDO AND SPMCNT ACCORDINGLY.  IF THE SPROCKET
                    /IS NOT FOUND IN THE RIGHT LOCATION THE ROUTINE
                    /DEFAULTS TO SYNC. LIKEWISE OF A SCAN FAILS
                    /THE TEST CORRECTLY THE PROGRAM DEFAULTS TO DEFECT.

01247  0000  PATRN,  0000      /SUBROUTINE TO INSPECT THE PATTERN
01250  7300          CLA CLL
01251  1022          TAD ACCTO     /SET UP INSPECTION ACCURACY
01252  3121          DCA VTOLTO
01253  4775'         JMS WAIT      /WAIT FOR A SCAN
01254  7340          CLA CLL CMA   /A SCAN HAS OCCOURED
01255  1473          TAD I VECPNT  /SET UP REFERENCE POINTER
01256  3011          DCA VECT
01257  4774'         JMS PSPROK    /DO SPROCKET ZONE CALCULATIONS
01260  4773'         JMS VERIFY    /SPROCKET DONE, NOW TEST SCAN
01261  1071          TAD MDCNT     /AT END OF PATTERN?
01262  7041          CIA
01263  1042          TAD PTMAX     /ADD MAX PATTERN DIMENSION
01264  7550          SPA SNA /SKIP IF NOT THERE;DONT CLEAR ACCUM
01265  5270          JMP .+3 /YES,AT OR BEYOND THE END
01266  2073          ISZ VECPNT    /INCREM TO NEXT REF VECTOR
01267  5253          JMP PATRN+4   /GO BACK FOR ANOTHER SCAN
01270  1023          TAD ACCMO     /BEYOND END OF PATTERN +ACC & REG
01271  1020          TAD RAMO      /ERRORS ALLOWED?
01272  7700          SMA CLA /SKIP IF BEYOND
01273  5253          JMP PATRN+4   /NO. NOTE VECTPNT NOT INCREMENTED
01274  5647          JMP I PATRN   /YES, GO BACK TO MAIN PROGRAM 01373  2000
01374  1600
01375  2600
01376  3711
01377  0777
       1400          PAGE
```

/PHOTO PRODUCTS FILM CHIP CARRIER PROGR   PAL8-V9B  NO/DA/TE  PAGE 20

```
             /%R SUBROUTINE END
             /%TW FINISH SCANNING OUT TO EN OF MD
             / INSPECTION ZONE VERIFYING THAT NO COPPER IS PRESENT
                    /DETERMINE IF REGISTRATION IS WITHIN TOLERENCE
             /AND STORE DIFFERENCES FOR POSSIBLE FUTURE USE.

01400  0000  END,   0000      /SUBROUTINE TO FINISH SCANNING A PATTERN
01401  4777'        JMS WAIT      /WAIT FOR A SCAN TO STAY IN SYNC
01402  4776'        JMS ZEROLK    /VERIFY NO COPPER
01403  7700         SMA CLA /OK IF >/= 0
01404  5207         JMP .+3
01405  7000         NOP           /NO - BAD SCAN EXCESSIVE COPPER
01406  5253         JMP ERR04
01407  1036         TAD PTMD2     / OK SO FAR,BEYOND INSPECTION ZONE?
01410  7041         CIA
01411  1072         TAD SHMCNT
01412  7710         SPA CLA /SKIP IF BEYOND
01413  5201         JMP END+1     /NOT YET, GO BACK
01414  4777'        JMS WAIT      /STAY IN SYNC. NOW CHECK REGISTRATION
01415  7300         CLA CLL /TO SEE IF IT IS WITHIN SPECIFICATIONS
01416  1072         TAD SHMCNT
01417  7041         CIA
01420  1071         TAD MDCNT     /DIFFERENCE OF SPMCNT AND MDCNT
01421  3067         DCA RMERR     /IS ERROR IN REG. STORE IT FOR FUTURE
                                  /USE.
01422  1040         TAD PTDI      /DO SAME FOR TD REG
01423  7041         CIA
01424  1041         TAD PTDO
01425  3070         DCA RTDERR
01426  1067         TAD RMERR     /DETERMINE IF ABSOL VALUE IS LESS
01427  7540         SMA SZA /THAN THAT ALLOWED.
01430  7041         CIA           /IF + NEGATE
```

```
01431  1020           TAD RAM0
01432  7710           SPA CLA  /IF >/= 0 IS WITHIN SPECS
01433  5273           JMP ERR5         /REGIS DEFECT
01434  1070           TAD RTDERR       /NOW CHECK TO REG ERROR
01435  7540           SMA SZA
01436  7041           CIA
01437  1021           TAD RAT0
01440  7710           SPA CLA
01441  5310           JMP ERR6
01442  3075           DCA QUALTY       /DEVICE OK, MAKE SURE QUALITY WORD=0
01443  5600           JMP I END        /DONE INSPECTING PATTERN AND IT IS GOOD 01444  7300   REGDEF, CLA CLL /REGIS DEFECT, PREPARE TO ENTER DEFECT ROUTINE
01445  1375           TAD (0063)       /SET UP BITS TO SHOW IT IS A REG
01446  3075           DCA QUALTY       /DEFECT
01447  1374           TAD (0003)       /NOW LIGHT MQ BITS TO SAY A DEFECT
01450  7501           MQA
01451  7421           MQL     /PUT RESULTS IN MQ REG
01452  5600           JMP I END        /DONE THIS PATTERN, GO BACK 01453  1123   ERR04,  TAD ERRPRT
01454  7640           SZA CLA
01455  5260           JMP .+3
```

/PHOTO PRODUCTS FILM CHIP CARRIER PROGR    PAL8-V98   NO/DA/TE   PAGE 28-1

```
01456  7001           IAC
01457  4773'          JMS DEFECT       /JMP WITH AC =1
01460  4772'          JMS TTME
01461  4543           TEXT /%#04 SH =/
01462  6054
01463  4023
01464  1040
01465  7500
01466  7300           CLA CLL
01467  1072           TAD SHMCNT
01470  4771'          JMS TTOP         /PRINT SH COUNTER
01471  7301           CLA CLL IAC
01472  4770'          JMS RESTRT       /JMP WITH AC =1
01473  1123   ERR05,  TAD ERRPRT
01474  7650           SNA CLA          /PRINT?
01475  5244           JMP REGDEF       /NO
01476  4772'          JMS TTME
01477  4543           TEXT /%#05 SH =/
01500  0065
01501  4023
01502  1040
01503  7500
01504  7300           CLA CLL
01505  1072           TAD SHMCNT
01506  4771'          JMS TTOP         /PRINT SCAN
01507  5770'          JMP RESTRT 01510  1123   ERR06,  TAD ERRPRT
01511  7650           SNA CLA          /PRINT?
01512  5244           JMP REGDEF       /NO
01513  4772'          JMS TTME         /YES
01514  4543           TEXT /%#06 SH =/
01515  0066
01516  4023
01517  1040
01520  7500
01521  1072           TAD SHMCNT
01522  4771'          JMS TTOP         /PRINT SCAN
01523  5770'          JMP RESTRT 01570  0240
01571  4007
01572  3467
01573  3035
01574  0003
01575  0063
01576  1000
01577  2600
       1600'          PAGE
```

/PHOTO PRODUCTS FILM CHIP CARRIER PROGR    PAL8-V9B  NO/DA/TE  PAGE 21

```
                /XR SUBROUTINE PSPROK
                /XTW LOOKS FOR THE SPROCKET
                / HOLE BY OBSERVING DATA TO THE LEFT OF THE
                /SPROCKET TO ZONE. WHEN THE SPROCKET IS DETECTED
                /DETERMINE IF WITHIN SPROCKET ZONE
                /ITS MD WIDTH IS CHECKED AND IF WITHIN TOLERENCE
                /THE SHCNT IS UPDATED AND LIKEWISE FOR SHTOVE 01600  0000  PSPROK,  0000     /SUBROUTINE TO STAY IN SYNC WITH SPROCKET
01601  7300          CLA CLL
01602  1032          TAD SHMDS1     /WITHIN SPROCKET ZONE?
01603  7041          CIA
01604  1072          TAD SHMCNT
01605  7710          SPA CLA
01606  5600          JMP I PSPROK
01607  1033          TAD SHMDS2     /BEYOND ZONE?
01610  7041          CIA
01611  1072          TAD SHMCNT
01612  7700          SMA CLA
01613  5272          JMP RETM
01614  1277          TAD PFLAG      /WITHIN ZONE BUT DETECTION COMPLETE?
01615  7440          SZA
01616  5600          JMP I PSPROK
01617  7300          CLA CLL
01620  1276          TAD PSFND      /SPROCKET DETECTED ON PREVIOUS SCAN?
01621  7640          SZA CLA
01622  5234          JMP PYES       /YES
01623  1130          TAD DATA       /NO-GET FIRST DATA VALUE WITHOUT DISTURBING
01624  0377          AND (5777)     /POINTER. MASK BIT 1
01625  1376          TAD (7000)     /SUB 512
01626  7640          SZA CLA /SPROCKET ONLY IF 0
01627  5600          JMP I PSPROK   /NO SPROCKET FOUND,RETURN
01630  7201          CLA IAC
01631  3300          DCA PCNT       /SPROCKET DETECTED, START TEMP. CNTER
01632  2276          ISZ PSFND      /SET SPROCKET FOUND FLAG
01633  5600          JMP I PSPROK   /RETURN TO MAIN PROGRAM 01634  1130  PYES,   TAD DATA       /SPROCKET PREVIOUSLY DETECTED
01635  0377          AND (5777)     /DETECTED THIS SCAN?
01636  1376          TAD (7000)     /ADD -512
01637  7640          SZA CLA /SPROCKET IF ZERO
01640  5251          JMP POFF       /BEYOND SPROCKET?
01641  2300          ISZ PCNT       /STILL SCANNING SPROCKET
01642  1027          TAD SHMDY      /DIVIDE SHMDY BY 2 AND SEE IF 1/2
01643  7000          NOP     /WAY THROUGH SPROCKET
01644  7010          RAR
01645  1300          TAD PCNT
01646  7650          SNA CLA /SKIP IF NOT IN CENTER
01647  4775!         JMS SPXTD      /IN CENTER. DETERMINE SHTOVE
01650  5600          JMP I PSPROK 01651  1025  POFF,   TAD SHMDY1     /SPROCKET NO LONGER DETECTED
01652  1300          TAD PCNT       /IS IT CORRECT WIDTH
01653  7710          SPA CLA
01654  5301          JMP ERR08      /WRONG WIDTH
```

/PHOTO PRODUCTS FILM CHIP CARRIER PROGR    PAL8-V9B  NO/DA/TE  PAGE 22

```
01655  1026          TAD SHMDY2     /LONG ENOUGH. NOW IS IT TOO LONG?
01656  1300          TAD PCNT
01657  7540          SMA SZA /MUST BE </= 0 TO BE GOOD
01660  5331          JMP ERR14      /TOO LONG, RESYNC
01661  7300          CLA CLL /WIDTH OK
01662  2277          ISZ PFLAG      /SET THE SPROCKET DONE FLAG
01663  1024          TAD SHMD1      /UPDATE SPROCKET COUNTER
01664  1300          TAD PCNT
01665  3072          DCA SHMCNT
01666  3276          DCA PSFND      /RESET SPROCKET DETECTED FLAG
01667  5600          JMP I PSPROK   /DONE, RETURN TO MAIN PROGRAM 01670  3276  PNOGO,  DCA PSFND      /SPROCKET TOO SHORT, STAY WITH PROGRAM
01671  5600          JMP I PSPROK   /BECAUSE MAY YET FIND IT
```

```
01572  1277  RETN,   TAD PFLAG
01573  7640          SZA CLA        /HAS SPROCKET BEEN FOUND?
01574  5600          JMP I PSPROK   /YES
01675  5315          JMP ERR07      /NO RESTART
01676  0000  PSFND,  0000           /FLAG TO TELL IF SPROCKET SCANS PREVIOUSLY
                                    /DETECTED
01577  0000  PFLAG,  0000           /FLAG TO TELL THAT SPROCKET WAS FOUND
                                    /AND IDENTIFIED
01700  0000  PCNT,   0000           /USED AS TEMP. COUNTER
01701  1123  ERR08,  TAD ERRPRT
01702  7650          SNA CLA        /PRINT?
01703  5270          JMP PNOGO      /NO
01704  4774'         JMS TTME       /YES
01705  4543          TEXT /%#08 SH =/
01706  5070
01707  4023
01710  1040
01711  7500
01712  1072          TAD SHMCNT
01713  4773'         JMS TTDP       /PRINT SCAN
01714  5772'         JMP RESTRT 01715  1123  ERR07,  TAD ERRPRT
01716  7650          SNA CLA        /PRINT?
01717  5772'         JMP RESTRT     /NO
01720  4774'         JMS TTME       /YES
01721  4543          TEXT /%#07 SH =/
01722  5067
01723  4023
01724  1040
01725  7500
01726  1072          TAD SHMCNT
01727  4773'         JMS TTDP       /PRINT SCAN
01730  5772'         JMP RESTRT 01731  1123  ERR14,  TAD ERRPRT
01732  7650          SNA CLA /PRINT?
01733  5772'         JMP RESTRT    /NO
/PHOTO PRODUCTS FILM CHIP CARRIER PROGR    PAL8-V9B  NO/DA/TE   PAGE 22-1

01734  4774'         JMS TTME      /YES
01735  4543          TEXT /%#14 SH =/
01736  0164
01737  4023
01740  1040
01741  7500
01742  1072          TAD SHMCNT
01743  4773'         JMS TTDP
01744  5772'         JMP RESTRT
01772  0240
01773  4007
01774  3467
01775  0400
01776  7003
01777  5777
       2000'         PAGE
/PHOTO PRODUCTS FILM CHIP CARRIER PROGR    PAL8-V9B  NO/DA/TE   PAGE 23

/%R SUBROUTINE VERIFY
              /%TW TEST A SCAN TO SEE IF IT IS GOOD
              /    ENTER WITH:
              /1.DATA POINTER AT BEGINING OF SCAN
              /2.REFERENCE POINTER AT BEGINNING OF REFERENCE
              /3.TO ACCURACY DESIRED IN VTOLTD
              /    EXIT WITH:
              /ACCUM=0 IF GOOD SCAN - JMP I VERIFY
              /ACCUM=POSITIVE  IF EXCESSIVE COPPER - JMP DEFECT
              /ACCUM NEGATIVE IF TOO LITTLE COPPER - JMP DEFECT
              /IF THE REFERENCE VECTOR IS SOMEHOW READ
              /INTO THE SUBROUTINE INCORRECTLY WITH THE TERMINATOR
              /BIT IN THE WRONG WORD, THE SUBROUTINE ERROR EXITS
              /WAIT A MESSAGE "REFERENCE ERROR" AND RESTARTS
              /AT LOCATION 200.
02000  0000  VERIFY, 0000           /SUBROUTINE TO VERIFY A LINE
02001  7300          CLA CLL
02002  3111          DCA VFLAG      /CLEAR END OF DATA FLAG
```

```
02003  3115            DCA VDU  /ZERO UPPER DATA REG
02004  3114            DCA VDL  /ZERO LOWER DATA REG
02005  1121            TAD VTOLTD    /SET UP LEFT EDGE OF ZONE
02006  7041            CIA
02007  1037            TAD PTTD
02010  3112            DCA VRL  /PUT IT IN LOWER REF REG
02011  6211            CDF 10   /CHANGE TO MEMORY FIELD 1 TO GET STANDARD
02012  1411            TAD I VECT    /GET 1ST REF VALUE
02013  6201            CDF 00   /CHANGE BACK TO DATA FIELD 0
02014  1041            TAD PTDD      /ADD DIODE ADDRESS OF LEFT OF PATTERN
02015  3113            DCA VRU  /AND PUT IT IN UPPER REF REG
02016  1115   VREAD,   TAD VDU  /SET UP DATA REGS
02017  3114            DCA VDL  /MOVE UPPER TO LOWER
02020  1412            TAD I DATAPT  /READ IN NEW DATA VALUE
02021  7510            SPA      /SKIP IF NOT TERMINATOR
02022  5233            JMP VDEND     /YES - IS TERMINATOR
02023  3115            DCA VDU  /STORE IT
02024  1115            TAD VDU  /NO - SEE IF >/= PTTD
02025  0377            AND (0777)
02026  7041            CIA
02027  1037            TAD PTTD
02030  7700            SMA CLA  /SKIP IF IN INSPECTION ZONE
02031  5216            JMP VREAD     /NO, TRY AGAIN
02032  5245            JMP VRETRN    /YES, START VERIFYING

/NEXT 2 INS ARE TEMP LAST EDGE TO END OF PAT
                       /IS NOT CHECKED

/////////////////////
                       /TEMP INS
                       /////////////////////

02033  7300   VDEND,   CLA CLL /DCA VDU       /STORE IT, DATA TERMINATOR FOUND!
02034  5306            JMP EXIT5+1   /TAD VDU
02035  0377            AND (0777)

/PHOTO PRODUCTS FILM CHIP CARRIER PROGR    PAL8-V9B  NO/DA/TE  PAGE 23-1

02036  7440            SZA      /SKIP IF 0 OR PERHAPS 512
02037  5243            JMP .+4  /NO - HAS A VALUE
02040  7300            CLA CLL  /YES - MAKE VALUE 511 WITH CU BIT & TERM BIT SET
02041  1376            TAD (5777)
02042  3115            DCA VDU  /PUT IT IN VDU
02043  7301            CLA CLL IAC   /PUT 1 IN FLAG
02044  3111            DCA VFLAG

/PHOTO PRODUCTS FILM CHIP CARRIER PROGR    PAL8-V9B  NO/DA/TE  PAGE 24

02045  1121   VRETRN,  TAD VTOLTD    /ADD TOL TO LOWER REF
02046  1112            TAD VRL
02047  3112            DCA VRL
02050  1121            TAD VTOLTD    /SUB TOL FROM UPPER REF
02051  7041            CIA
02052  1113            TAD VRU
02053  3113            DCA VRU
02054  1113            TAD VRU  /NOW SEE IF TOL HAS MADE
02055  0377            AND (0777)    /VRU-VRL </= 0
02056  3116            DCA V1
02057  1112            TAD VRL
02060  0377            AND (0777)
02061  7041            CIA
02062  1116            TAD V1
02063  7510            SPA      /SKIP IF TESTING REQUIRED
02064  5274            JMP VTSTED    /IS A DONT CARE ZONE
02065  7300            CLA CLL
02066  1113            TAD VRU  /NOW SEE IF COPPER SHOULD BE PRESENT
02067  0375            AND (1000)
02070  7640            SZA CLA  /SKIP IF NO COPPER
02071  7301            CLA CLL IAC   /IS COPPER, PUT 1 IN VCOP
02072  3122            DCA VCOP
02073  4774'           JMS VTEST     /GO TEST LEAD (OR LEAD SPACE)
02074  7300   VTSTED,  CLA CLL  /IF MADE IT HERE SCAN IS OK SO FAR
02075  1112            TAD VRL
02076  7710            SPA CLA  /SEE IF REFERENCE OK SO FAR
02077  5600   EXIT5,   JMP I VERIFY  /OK EXIT
```

```
02100  1113            TAD VRU    /DONE SCAN?
02101  7710            SPA CLA    /NEGATIVE IF END
02102  5773'           JMP VLAST          /GOOD SCAN SO FAR
02103  1113            TAD VRU    /NOT DONE LINE YET
02104  0372            AND (2000)         /GET BIT 1-DETERMINE IF ON EDGE OF
                                          /DONT CARE ZONE
02105  7650            SNA CLA /SKIP IF BIT IS 1
02106  5771'           JMP VRUVRL         /BIT IS 1
02107  6211            CDF 10  /CHANGE TO FIELD 1 FOR REFERENCE PATTERN
02110  1411            TAD I VECT         /MUST BE 0, READ IN NEXT REF PAIR
02111  1241            TAD PTDO           /IS A DONT CARE EDGE
02112  3112            DCA VRL
02113  1112            TAD VRL            /GET REFERENCE VALUE
02114  7500            SMA                /LAST REFERENCE VALUE?
02115  5333            JMP RETNM          /NO
02116  6201            CDF 0              /YES, ARE ANY DATA VALUES >
                                          /LAST REFERENCE VALUE?
02117  1121            TAD VTOLTD
02120  0377            AND (0777          /GET DIODE ADDRESS
02121  3770'           DCA LSTEDG
02122  1412   NXDTA,   TAD I DATAPT       /GET NEXT DATA VALUE
02123  7510            SPA                /LAST DATA VALUE?
02124  5757'           JMP ENDSCN         /YES
02125  0377            AND (0777          /NO
02126  7041            CIA
02127  1770'           TAD LSTEDG
                ///////////////////////////
                /TEMP INS

/PHOTO PRODUCTS FILM CHIP CARRIER PROGR   PAL8-V9B  NO/DA/TE  PAGE 24-1

///////////////////////////

02130  7300            CLA CLL /SMA CLA                  /DATA > LAST EDGE?
02131  5322            JMP NXDTA      /NO, TEST NEXT DATA
02132  5766'           JMP ERR15              /YES,COPPER BEYOND LAST EDGE
02133  7300   RETNM,   CLA CLL
02134  1411            TAD I VECT
02135  1241            TAD PTDO
02136  3113            DCA VRU
02137  6201            CDF 00  /CHANGE BACK TO DATA FIELD 0
02140  5245            JMP VRETRN         /GO BACK AND CONTINUE
02165  2225
02167  2211
02170  2224
02171  2206
02172  2300
02173  2213
02174  2241
02175  1000
02176  5777
02177  0777
       2200            PAGE 02200  1113   VRUVRL,  TAD VRU /MOVE VRU TO VRL
02201  1121            TAD VTOLTD         /PUT ACC BACK IN, WAS PREV SUB
02202  3112            DCA VRL
02203  6211            CDF 10  /CHANGE TO DATA FIELD 1
02204  1411            TAD I VECT
02205  1041            TAD PTDO
02206  3113            DCA VRU
02207  6201            CDF 00  /CHANGE BACK TO FIELD 0 DATA FIELD
02210  5777'           JMP VREAD          /GO BACK AND CONTINUE
02211  7300   ENDSCN,  CLA CLL
02212  5776'           JMP EXIT5
                ///////////////////////////
                /TEMP INS
                ///////////////////////////

02213  5211   VLAST,   JMP ENDSCN        /TAD VRU        /GET UPPER REF
02214  1121            TAD VTOLTD        /ADD ERROR
02215  3112            DCA VRL
02216  1375            TAD (4777
02217  3113            DCA VRU
02220  1111            TAD VFLAG          /SEE IF DATA TERM FOUND
02221  7540            SZA CLA
02222  5774'           JMP VRETRN         /DON'T READ MORE DATA
02223  5777'           JMP VREAD          /READ MORE DATA
```

```
02224  0000   LSTEDG, 0

02225  1123   ERR15,  TAD ERRPRT
02226  7650           SNA CLA          /PRINT?
```
/PHOTO PRODUCTS FILM CHIP CARRIER PROGR    PAL8-V9B   NO/DA/TE   PAGE 24-2

```
02227  4773'          JMS DEFECT       /NO
02230  4772'          JMS TTME         /YES
02231  4543           TEXT /%#15 SH */
02232  0165
02233  4023
02234  1040
02235  7500
02236  1072           TAD SHMCNT
02237  4771'          JMS TTOP         /PRINT SCAN
02240  4770'          JMS RESTRT
```
/PHOTO PRODUCTS FILM CHIP CARRIER PROGR    PAL8-V9B   NO/DA/TE   PAGE 25

```
       /%R SUBROUTINE VTEST
       /%TW TESTS FOR COPPER OR ABSENCE
       / OF COPPER WITHIN A ZONE DEFINED BY THE REFERENCE
       /VECTOR. ROUTINE IS USED AS A PART OF VERIFY.

02241  0000   VTEST,  0000     /GET HERE FROM VERIFY
02242  1114           TAD VDL  /STRIP OFF 3 MSBS
02243  0367           AND (0777)
02244  7041           CIA      /NEGATE
02245  3116           DCA V1   /TEMP STORAGE
02246  1112           TAD VRL  /CHECK LEFT EDGE
02247  0367           AND (0777)   /OF ZONE
02250  3117           DCA V2
02251  1117           TAD V2
02252  1116           TAD V1
02253  7710           SPA CLA  /IS VDL </= VRL
02254  5300           JMP ERR09        /NO-DEFECT, ERROR 9
02255  1113   VTEST1, TAD VRU  /NOW CHECK RIGHT EDGE
02256  0367           AND (0777)
02257  7041           CIA
02260  3116           DCA V1
02261  1115           TAD VDU
02262  0367           AND (0777)
02263  3120           DCA V3
02264  1120           TAD V3
02265  1116           TAD V1
02266  7710           SPA CLA  /IS VRU</=VDU
02267  5766'          JMP VTSTM        /MAY BE A DEFECT?
02270  1114           TAD VDL  /MAY BE OK
02271  0365           AND (1000)       /IS ZONE COPPER
02272  7640           SZA CLA
02273  7340           CLA CLL CMA      /YES IS CU, SET ACC=-1
02274  1122           TAD VCOP         /WHAT SHOULD IT BE
02275  7640           SZA CLA  /SKIP IF GOOD
02276  5316           JMP ERR10        /DEFECT
02277  5641           JMP I VTEST      /GOOD -EXIT BACK TO VERIFY 02300  1123   ERR09,  TAD ERRPRT
02301  7650           SNA CLA          /PRINT?
02302  5764'          JMP VBAD         /NO
02303  4772'          JMS TTME         /YES
02304  4543           TEXT /%#09  SH= /
02305  0071
02306  4040
02307  2310
02310  7540
02311  0000
02312  7300           CLA CLL
02313  1072           TAD SHMCNT
02314  4771'          JMS TTOP
02315  5770'          JMP RESTRT 02316  1123   ERR10,  TAD ERRPRT
02317  7650           SNA CLA
02320  5764'          JMP VBAD
```

```
02321  4772'         JMS TTME
02322  4543          TEXT /%#10  SH= /
02323  5160
02324  4040
02325  2310
02326  7540
02327  000F
02330  7300          CLA CLL
02331  1072          TAD SHMCNT
02332  4771'         JMS TTOP
02333  5770'         JMP RESTRT
02364  2427
02365  1060
02366  2430
02367  0777
02370  0240
02371  4007
02372  3457
02373  0035
02374  2045
02375  4777
02376  2077
02377  2016
       2400'         PAGE
```

/PHOTO PRODUCTS FILM CHIP CARRIER PROGR    PAL8-V9B   NO/DA/TE   PAGE 26

```
02400  1120  VTSTM,  TAD V3
02401  7041          CIA
02402  1117          TAD V2
02403  7710          SPA CLA
02404  5255          JMP ERR11       /BAD ZONE
02405  1111          TAD VFLAG       /IS FLAG SET
02406  7640          SZA CLA
02407  5271          JMP ERR12       /BAD ZONE
02410  1115          TAD VDU /NOT WITHIN ZONE, THATS THE PROBLEM
                             /BRING IN MORE DATA AND FIND ZONE
02411  3114          DCA VDL
02412  1412          TAD I DATAPT
02413  3115          DCA VDU
02414  1115          TAD VDU
02415  7700          SMA CLA /DATA TERMINATOR?
02416  5777'         JMP VTEST1      /MAY BE OK, TRY AGAIN
02417  1115          TAD VDU /DATA TERMINATOR FOUND
02420  0376          AND (0777)
02421  7650          SNA CLA /IS VALUE 0 OR PERHAPS 512?
02422  1375          TAD (0777)      /YES-MAKE IT 511
02423  3115          DCA VDU
02424  7301          CLA CLL IAC
02425  3111          DCA VFLAG
02426  5777'         JMP VTEST1

02427  7300  VBAD,   CLA CLL /DETERMINE IF COPPER MISSING OR EXCESSIVE
02430  1122          TAD VCOP
02431  7640          SZA CLA
02432  5235          JMP .+3 /MISSING CU
02433  7301          CLA CLL IAC     /EXCESSIVE CU, SET ACCUM=1
02434  4775'         JMS DEFECT
02435  7340          CLA CLL CMA     /SET ACC=-1
02436  5234          JMP .-2

02437  4774' REFERR, JMS TTME        /REFERENCE ERROR
02440  4543          TEXT /%## REFERENCE ERROR!%#/
02441  4340
02442  2205
02443  0605
02444  2205
02445  1603
02446  0540
02447  0522
02450  2217
02451  2241
02452  4543
```

```
02403  0000
02404  5773'         JMP 200    /RESTART 02405  1123   ERR11, TAD ERRPRT
02406  7650          SNA CLA    /PRINT?
02457  5227          JMP VBAD   /NO
02460  4774'         JMS TTME   /YES
02461  4543          TEXT /%#11 SH =/
```

/PHOTO PRODUCTS FILM CHIP CARRIER PROGR    PAL8-V98   NO/DA/TE   PAGE 26-1

```
02462  0161
02463  4023
02464  1040
02465  7500
02466  1072          TAD SHMCNT
02467  4772'         JMS TTOP   /PRINT SCAN
02470  5771'         JMP RESTRT 02471  1123   ERR12, TAD ERRPRT
02472  7650          SNA CLA    /PRINT?
02473  5227          JMP VBAD   /NO
02474  4774'         JMS TTME   /YES
02475  4543          TEXT /%#12 SH =/
02476  6162
02477  4023
02500  1040
02501  7500
02502  1072          TAD SHMCNT
02503  4772'         JMS TTOP   /PRINT SCAN
02504  5771'         JMP RESTRT
```

/PHOTO PRODUCTS FILM CHIP CARRIER PROGR    PAL8-V98   NO/DA/TE   PAGE 27

```
              /%R SUBROUTINE SERVE
              /%TW INTERRPT SERVICE ROUTINE
              /
              /
02505  3320   SERVE, DCA SAVAC    /SAVE AC
02506  1000          TAD 0
02507  3321          DCA SAVPC    /SAVE PROGRAM
                                  /COUNTER
02510  6004          GTF
02511  3322          DCA SAVMF    /SAVE FLAGS
02512  6143          FPSF         /FP FLAG SET?
02513  7410          SKP          /NO
02514  5770'         JMP SCANIN   /YES
02515  6031          KSF          /KEYBOARD?
02516  5767'         JMP INTERR   /NO MUST BE A ERROR
02517  5323          JMP KBDIN    /YES 02520  0000   SAVAC, 0
02521  0000   SAVPC, 0
02522  0000   SAVMF, 0
```

/PHOTO PRODUCTS FILM CHIP CARRIER PROGR    PAL8-V98   NO/DA/TE   PAGE 28

```
              /%R SUBROUTINE KEYBOARD
              /%TW KEYBOARD PROCESSOR - JUMPS TO ODT ROUTINE IF
              /CHARACTER   IS * OTHERWISE RETURNS TO INTERRUPTED
              /PROGRAM
              /
              /
02523  7300   KBDIN, CLA CLL
02524  6030          KCF          /CLEAR KEYBOARD FLAG
02525  6036          KRB          /READ KEYBOARD BUFFER
02526  7041          CIA
02527  1366          TAD (252
02530  7640          SZA CLA      /IS IT * ?
02531  5333          JMP PIRET    /RETURN TO INTERRUPTED PROGRAM
02532  5765'         JMP L277     /GO TO ODT
```

/PHOTO PRODUCTS FILM CHIP CARRIER PROGR    PAL8-V9B   NO/DA/TE    PAGE 29

```
                /%R SUBROUTINE INTERRUPT RETURN
                /%TW  SETS UP RETURN TO INTERRUPTED PROGRAM
                /
                /
02563  7300    PIRET,  CLA CLL
02564  1322            TAD SAVMF      /GET FLAGS
02565  6005            RTF            /RESTORE FLAGS
02566  7200            CLA
02567  1329            TAD SAVAC      /GET AC
02570  5721            JMP I SAVPC    /RETURN TO INTERRUPTED PROGRAM
02565  6600
02566  0252
02567  2746
02570  2616
02571  0240
02572  4007
02573  0200
02574  3467
02575  3035
02576  0777
02577  2255
       2500    PAGE
```

/PHOTO PRODUCTS FILM CHIP CARRIER PROGR    PAL8-V9B   NO/DA/TE    PAGE 30

```
                /%R SUBROUTINE WAIT
                /%TW INPUTS DATA FROM M LOGIC
                / ROTATES BIT THROUGH ACCUM WHILE WAITING FOR INTERRUPT
                /READS IN 32 DATA WORDS WHEN M1703 INTERRUPT RECEIVED
                /CHECKS FOR OVERSPEED BY VERIFING GOT INTO WAIT ROUTINE
                /INCREMENTS MD COUNTERS FOR EACH SCAN
                /RESETS DATA POINTER BEFORE JUMPING OUT 02600  0000    WAIT,   0000           /WAIT FOR INTERRUPT
02601  6007            CAF
02602  6001            ION            /TURN ON INTERRUPTS, MAY BE ON ALREADY
02603  6141            FPEI           /ENABLE M1703
02604  7201            CLA IAC        /WAIT FOR INTERRUPT
02605  3332            DCA RATEOK     /#1 VERIFIES PROGRAM MADE IT HERE
02606  7301    ROTATE, CLA CLL IAC    /BACKGROUND PROGRAM
02607  2215            ISZ COUNT
02610  5207            JMP .-1        /ROTATE BIT THROUGH ACCUM
02611  2215            ISZ COUNT
02612  5211            JMP .-1
02613  7004            RAL            /MOVES BIT TO LEFT
02614  5207            JMP ROTATE+1
02615  0000    COUNT,  0000

02616  7300    SCANIN, CLA CLL
02617  1076            TAD DATAST     /SET UP DATA POINTER
02620  3012            DCA DATAPT
02621  6144            FPRD           /IMMEDIATELY READY TO READ
02622  3412            DCA I DATAPT   /WOULD NOT BE HERE
02623  6144            FPRD
02624  3412            DCA I DATAPT   /DO THIS 32 TIMES
02625  6144            FPRD
02626  3412            DCA I DATAPT   /IT MIGHT TAKE A LOT OF
02627  6144            FPRD           /INSTRUCTION ROOM BUT IT IS
02630  3412            DCA I DATAPT   /SURE FAST
02631  6144            FPRD
02632  3412            DCA I DATAPT
02633  6144            FPRD
02634  3412            DCA I DATAPT
02635  6144            FPRD
02636  3412            DCA I DATAPT
02637  6144            FPRD
02640  3412            DCA I DATAPT
02641  6144            FPRD
02642  3412            DCA I DATAPT
02643  6144            FPRD
02644  3412            DCA I DATAPT
02645  6144            FPRD
02646  3412            DCA I DATAPT
02647  6144            FPRD
```

```
02650   3412            DCA I DATAPT
02651   6144            FPRD
02652   3412            DCA I DATAPT
02653   6144            FPRD
02654   3412            DCA I DATAPT
```
/PHOTO PRODUCTS FILM CHIP CARRIER PROGR    PAL8-V98  NO/DA/TE  PAGE 31

```
02655   6144            FPRD
02656   3412            DCA I DATAPT
02657   6144            FPRD
02660   3412            DCA I DATAPT
02661   6144            FPRD
02662   3412            DCA I DATAPT
02663   6144            FPRD
02664   3412            DCA I DATAPT
02665   6144            FPRD
02666   3412            DCA I DATAPT
02667   6144            FPRD
02670   3412            DCA I DATAPT
02671   6144            FPRD
02672   3412            DCA I DATAPT
02673   6144            FPRD
02674   3412            DCA I DATAPT
02675   6144            FPRD
02676   3412            DCA I DATAPT
02677   6144            FPRD
02700   3412            DCA I DATAPT
02701   6144            FPRD
02702   3412            DCA I DATAPT
02703   6144            FPRD
02704   3412            DCA I DATAPT
02705   6144            FPRD
02706   3412            DCA I DATAPT
02707   6144            FPRD
02710   3412            DCA I DATAPT
02711   6144            FPRD
02712   3412            DCA I DATAPT
02713   6144            FPRD
02714   3412            DCA I DATAPT
02715   6144            FPRD
02716   3412            DCA I DATAPT
02717   6144            FPRD
02720   3412            DCA I DATAPT
02721   1332            TAD RATEOK      /FINALLY DONE,CHECK FOR
02722   7710            SPA CLA  /OVERSPEED
02723   5333            JMP OVERSP      /INTERRUPT HAPPENED BEFORE WAIT ROUTINE
02724   3332            DCA RATEOK      /RESET RATE FLAG
02725   1076            TAD DATAST      /RESET POINTERS
02726   3012            DCA DATAPT
02727   2071            ISZ MDCNT
02730   2072            ISZ SHMCNT
02731   5600            JMP I WAIT
02732   0000   RATEOK,  0000    /USE FOR OVERSPEED CHECK 02733   4777'  OVERSP,  JMS TTME        /DATA OVERSPEED
02734   4543            TEXT /%** OVERSPEED!%*/
02735   4342
02736   1726
02737   0522
02740   2320
02741   0505
```
/PHOTO PRODUCTS FILM CHIP CARRIER PROGR    PAL8-V98  NO/DA/TE  PAGE 31-1

```
02742   0441
02743   4543
02744   0000
02745   5776'           JMP 200 /RESTART 02746   4777'  INTERR,  JMS TTME        /INTERRUPT ERROR
02747   4543            TEXT /%** INTERRUPT ERROR%*/
02750   4340
02751   1116
02752   2405
02753   2222
```

```
02754   2520
02755   2440
02756   0522
02757   2217
02760   2245
02761   4300
02762   5776'        JMP 200    /RESTART 02776   0200
02777   3467
        3000'        PAGE
```

/PHOTO PRODUCTS FILM CHIP CARRIER PROGR    PAL8-V9B   NO/DA/TE   PAGE 32

```
        /%R SUBROUTINE LIGHT LEVEL
        /%TW CHECKS FOR MINIMUM LIGHT LEVEL
        / THIS ROUTINE SHOULD BE ENTERED ONLY IF PRESENTLY
        /SCANNING THE MIDDLE OF A SPROCKET HOLE 03000  0000   LGTLEV,  0000    /SUBROUTINE TO CHECK LIGHTLEVEL
03001  7201            CLA IAC
03002  1076            TAD DATAST      /SET UP POINTER TO SECOND
03003  3012            DCA DATAPT      /DATA WORD
03004  3220            DCA LGR1        /CLEAR REGISTER
03005  1412            TAD I DATAPT    /GET SECOND WORD
03006  0377            AND (2000)      /STRIP OFF LIGHT BIT
03007  7650            SNA CLA /SKIP IF LIGHT BIT SET
03010  5221            JMP ERR01       /TURN OFF LOGHT LEVEL DISPLAY
03011  1376            TAD (6000)      /TURN ON DISPLAY
03012  3220            DCA LGR1
03013  7701   LDMQ,    ACL             /LOAD MQL INTO ACCUM
03014  0375            AND (1777)      /CLEAR LIGHT LEVEL BITS
03015  1220            TAD LGR1        /ADD LIGHT LEVEL STATUS
03016  7421            MQL             /LOAD MQL
03017  5600            JMP I LGTLEV    /DONE, RETURN 03020  0000   LGR1,    0000    /TEMPORARY STORAGE 03021  1123   ERR01,   TAD ERPPRT
03022  7650            SNA CLA         /PRINT?
03023  5213            JMP LDMQ
03024  4774'           JMS TTME        /YES
03025  4543            TEXT /%#01 SH -/
03026  5001
03027  4023
03030  1040
03031  5500
03032  1072            TAD SHMCNT
03033  4773'           JMS TTDP        /PRINT SCAN
03034  5213            JMP LDMQ
```

/PHOTO PRODUCTS FILM CHIP CARRIER PROGR    PAL8-V9B   NO/DA/TE   PAGE 33

```
        /%R ROUTINE DEFECT
        /%TW A PATTERN DEFECT CAUSES DEFALT TO THIS
        / ROUTINE. THE QUALTY WORD IS RECORDED AS HAVING A PATTERN DEFECT.
        /THE DEFECT BITS(ONLY) ARE RAISED AT ONCE.
        /THEN THE SYSTEM WAITS UNTIL THE PATTERN IS PAST AND
        /THEN RETURNS TO INITAL. THE ROUTINE DOES CHECK FOR SHMDCT
        /=300 AND RESETS IT TO ZERO, AND IT ALSO LOOKS FOR MD POSITION
        /IN THE SPROCKET ZONE AND GOES TO THE SUBROUTINES THAT
        /ASSURE CONTINUED MD SYNC.

03035  0000   DEFECT,  0               /A PATTERN DEFECT HAS OCCOURED
03036  7300            CLA CLL
03037  1372            TAD (0017)      /SET UP PATTERN DEFECT BITS
03040  3075            DCA QUALTY      /QUALTY WORD SET
03041  1371            TAD (0003)
03042  7501            MQA             /SET DEFECT LIGHTS
03043  7421            MQL             /PUT RESULTS BACK IN MQ DISPLAY
03044  4772'  DEWAIT,  JMS WAIT        /WAIT FOR A SCAN
03045  7300            CLA CLL
03046  1367            TAD (-454)      /DETERMINE IF SHMCNT=300
03047  1072            TAD SHMCNT
03050  7650            SNA CLA /SKIP IF NOT
03051  3072            DCA SHMCNT      /RESET TO ZERO
```

```
03052  4766'        JMS PSPROK       /KEEP IN SYNC WITH SPROCKET
03053  7300         CLA CLL
03054  7000         NOP              /NOW CHECK IF AT END OF PATTERN
03055  1036         TAD PTM02        /INSPECTION ZONE
03056  7041         CIA              /NEGATE
03057  1072         TAD SHMCNT
03060  7640         SZA CLA          /SKIP IF ARE THERE
03061  5244         JMP OEWAIT       /NO, GO BACK AND WAIT
03062  5765'        JMP INSPCT       /READY TO GO AGAIN
03165  0242
03166  1600
03167  7324
03170  2600
03171  0003
03172  0017
03173  4007
03174  3467
03175  1777
03176  5000
03177  2000
       3200'        PAGE
```

/PHOTO PRODUCTS FILM CHIP CARRIER PROGR    PAL8-V98   NO/DA/TE   PAGE 34

/TELETYPE-LINEPRINTER INPUT-OUTPUT UTILITY SUBROUTINES

/KMB-2/20/69

/SUBROUTINES INCLUDED IN PACKAGE:

/TTGC    CALL:  JMS TTGC
             /SUBROUTINE GETS SINGLE CHATACTER FROM KEYBOARD,
             /CHECKS FOR ^C, AND RETURNS TO JMS+1 WITH ASCII
             /CHARACTER IN C(AC).

/TTGN    CALL: JMS TTGN
             /SUBROUTINE GETS UNSIGNED NUMBER (BASE 10) FROM
             /KEYBOARD, CHECKS FOR ^C, CHECKS FOR OVERFLOW (LARGER
             /THAN 4095), CONVERTS NUMBER TO OCTAL AND RETURNS
             /TO JMS+1 WITH NUMBER IN C(AC).

/TTCS    CALL: JMS TTCS
             /SUBROUTINE GETS COMMAND STRING FROM KEYBOARD IN
             /THE FORM OF M,NX WHERE M & N ARE NUMBERS AND X IS A
             /PRINTING SYMBOL. CHECKS ARE MADE FOR COMMAND FORMAT,
             /^C AND NUMERICAL OVERFLOW. RETURN IS TO JMS+1
             /WITH M IN C(TTM), N IN C(TTN), X IN C(TTX) AND
             /C(AC)=0. TTM, TTN & TTX ARE PROVIDED IN SUBROUTINE.

/TTME    CALL: JMS TTME
             /SUBROUTINE PRINTS CHARACTERS PACKED INTO MEMORY
             /LOCATIONS FOLLOWING JMS UNTIL "00" IS ENCOUNTERED.
             /RETURN IS TO LOCATION FOLLOWING "00".

/LPME    CALL: JMS LPME
             /SAME AS TTME EXCEPT OUTPUT IS TO LINEPRINTER.

/TTPR    CALL: JMS TTPR
             /SAME AS TTME EXCEPT STANDARD ASCII CODES ARE USED
             /INSTEAD OF PACKED CODES.

/LPPR    CALL: JMS LPPR
             /SAME AS TTPR EXCEPT OUTPUT IS TO LINEPRINTER.

/TTOP    CALL: JMS TTOP
             /SUBROUTINE CONVERTS C(AC) TO DECIMAL AND OUTPUTS
             /IT AS 4 DIGITS ON TELETYPE. NO FORMATING OR CR-LF
             /IS PROVIDED.

/LPOP    CALL: JMS LPOP
             /SAME AS TTOP EXCEPT OUTPUT IS TO LINEPRINTER.

/TTDO    CALL: JMS TTDO  -       WITH COMMAND "HIGH" IN JMS+1
             /SUBROUTINE CONVERTS DOUBLE PRECISION BCD NUMBER
             /PACKED IN "HIGH" & "LOW" TO A DOUBLE PRECISSION
             /OCTAL NUMBER AND EXITS TO LOCATION OF JMS+2 WITH
             /HIGH ORDER OCTAL NUMBER IN C(AC) AND LOW ORDER IN

```
/PHOTO PRODUCTS FILM CHIP CARRIER PROGR    PAL8-V98   NO/DA/TE   PAGE 34-1

/"LOW".

/TTYN    CALL: JMS TTYN
         /SUBROUTINE ACCEPTS "YES" OR "NO" FROM KEYBOARD
         /AND RETURNS WITH C(AC)=1 FOR YES AND C(AC)=0
         /FOR NO.  ANY OTHER TYPE-IN CAUSES AND ERROR
         /TYPEOUT AND RECYCLES SUBROUTINE.
```

I claim:

1. An automatic electro-optical scanning inspection system for detecting and locating a variety of defect conditions in a binary patterned web and subjects of inspection carried thereby having intricately designed planar surfaces which are characterized by binary signals representative of preselected features of said scanned surfaces, comprising a radiation source trained on a subject of inspection, electro-optical means scanning said subject of inspection and detecting modulated radiation representing transitions onto and off of said web from said subject of inspection, said electro-optical means generating as data output binary electrical signals representative of the registration of patterns on said web and also the quality of individual features thereof, a computer pre-processor receiving said data output from said electro-optical means and composing binary words incorporating, as discrete components, the results of said electro-optical scanning together with the transverse address locations of the transitions in the inspected area which was the subject of said electro-optical scanning, means delivering said binary words to a computer, said computer converting said binary words to unique status by incorporating machine direction location data therein, said computer then comparing said unique binary words with binary words stored in said computer defining an acceptable product standard derived from a master locational pattern inclusive of preselected tolerance limits, and means responsive to said computer passing or rejecting said subjects of inspection, said data pre-processor comprising a logic system receiving as input from said electro-optical means data enable, array clock and video data signals and means composing from said input, binary words incorporating, as discrete components, the results of said electro-optical scanning together with the transverse location address of the inspected area which was the subject of said electro-optical scanning, and means storing said binary words until read out by said computer.

2. The invention of claim 1 wherein said computer is provided with an OFF-LINE program incorporating an algorithm defining characteristics of the pattern to be inspected directly from a design drawing and in combination with stated machine direction tolerances, and means developing a pattern reference file employing said algorithm.

3. The invention of claim 1 wherein said computer is provided with an ON-LINE program incorporating an algorithm processing transition data received from said computer pre-processor circuit in combination with transverse direction tolerances and comparing said transition data with said master locational pattern.

4. An automatic electro-optical scanning inspection system for detecting and locating a variety of defect conditions in a binary patterned web and subjects of inspection carried thereby having intricately designed planar surfaces which are characterized by binary signals representative of preselected features of said scanned surfaces, comprising a radiation source trained on a subject of inspection, electro-optical means scanning said subject of inspection and detecting modulated radiation representing transitions onto and off of said web from said subject of inspection, said electro-optical means generating as data output binary electrical signals representative of the registration of patterns on said web and also the quality of individual features thereof, a computer pre-processor receiving said data output from said electro-optical means and composing binary words incorporating, as discrete components, the results of said electro-optical scanning together with the transverse address locations of the transitions in the inspected area which was the subject of said electro-optical scanning, means delivering said binary words to a computer, said computer converting said binary words to unique status by incorporating machine direction location data therein, said computer then comparing said unique binary words with binary words stored in said computer defining an acceptable product standard derived from a master locational pattern inclusive of preselected tolerance limits, and means responsive to said computer passing or rejecting said subjects of inspection, said computer being provided with an OFF-LINE program incorporating an algorithm defining characteristics of the pattern to be inspected directly from a design drawing and in combination with state machine direction tolerances, and means developing a pattern reference file employing said alogrithm.

5. An automatic electro-optical scanning inspection system for detecting a variety of defect conditions in a binary patterned web and subjects of inspection carried thereby having intricately designed planar surfaces which are characterized by binary signals representative of preselected features of said scanned surfaces, comprising a radiation source trained on a subject of inspection, electro-optical means scanning said subject of inspection and detecting modulated radiation representing transitions onto and off of said web from said subject of inspection, said electro-optical means generating as data output binary electrical signals representative of the registration of patterns on said web and also the quality of individual features thereof, a computer pre-processor receiving said data output from said electro-optical means and composing binary words incorporating, as discrete components, the results of said electro-optical scanning together with the transverse address locations of the transitions in the inspected area which was the subject of said electro-optical scanning, means delivering said binary words to a computer, said computer converting said binary words to unique status by incorporating machine direction location data therein, said computer then comparing said unique binary words with binary words stored in said computer defining an acceptable product standard derived from a master locational pattern inclusive of preselected tolerance limits, and means responsive to said computer passing or rejecting said subjects of inspection, said computer being provided with an ON-LINE program incorporating an algorithm processing transition data received from said computer pre-processor circuit in combination with transverse direction tolerances and comparing said transition data with said master locational pattern.

* * * * *